United States Patent
Nagawatari et al.

(10) Patent No.: US 11,402,253 B2
(45) Date of Patent: Aug. 2, 2022

(54) FLUID SENSING APPARATUS AND METHOD FOR DETECTING FAILURE OF FLUID SENSOR

(71) Applicant: MINEBEA MITSUMI Inc., Nagano (JP)

(72) Inventors: Minoru Nagawatari, Tokyo (JP); Satoshi Suzuki, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 332 days.

(21) Appl. No.: 16/449,733

(22) Filed: Jun. 24, 2019

(65) Prior Publication Data
US 2019/0391000 A1 Dec. 26, 2019

(30) Foreign Application Priority Data

Jun. 26, 2018 (JP) .............................. JP2018-121108
Jun. 14, 2019 (JP) .............................. JP2019-111469

(51) Int. Cl.
*G01F 25/10* (2022.01)
*G01F 1/696* (2006.01)

(52) U.S. Cl.
CPC .............. *G01F 25/10* (2022.01); *G01F 1/696* (2013.01)

(58) Field of Classification Search
CPC ...... G01F 25/0007; G01F 1/696; G01F 1/692; G01F 1/6965; G01F 1/6845; G01F 25/0053; G01D 18/00; G01D 5/16
See application file for complete search history.

(56) References Cited

U.S. PATENT DOCUMENTS

| 2004/0163464 | A1 | 8/2004 | Nakada et al. |
| 2007/0116083 | A1* | 5/2007 | Oda ........................ G01F 1/696 |
| | | | 374/29 |
| 2012/0192644 | A1* | 8/2012 | Asano ..................... G01F 1/698 |
| | | | 73/204.26 |
| 2016/0025540 | A1 | 1/2016 | Clay et al. |

FOREIGN PATENT DOCUMENTS

| JP | 2004-257870 | 9/2004 |
| JP | 2016-510879 | 4/2016 |
| WO | WO-8901132 A1 * | 2/1989 ........... G01L 9/0098 |

OTHER PUBLICATIONS

IEEE Sensors, 2010, Coating diagnostics for thermal mass flowmeters, Pape et al (Year: 2010).*

* cited by examiner

Primary Examiner — Eric S. McCall
Assistant Examiner — Timothy P Graves
(74) Attorney, Agent, or Firm — IPUSA, PLLC

(57) ABSTRACT

A fluid sensing apparatus includes a fluid sensor configured to detect a temperature distribution on a detection surface caused by heating, and output a signal value corresponding to a flow of a fluid; a falling time counting unit configured to count a falling time of the signal value after stopping the heating; and a failure determining unit configured to perform failure determination based on the falling time.

12 Claims, 24 Drawing Sheets

FIG.23

|  | Vxu | Vxd | Vyu | Vyd |
|---|---|---|---|---|
| Tf [ms] | 20 | 19 | 20 | 19 |

FIG.26

|  | Vxu | Vxd | Vyu | Vyd |
|---|---|---|---|---|
| Tf [ms] | 95 | 113 | 111 | 130 |

FIG.29

|        | Vxu | Vxd | Vyu | Vyd |
|--------|-----|-----|-----|-----|
| Tf [ms] | 189 | 277 | 61  | 34  |

FLUID SENSING APPARATUS AND METHOD FOR DETECTING FAILURE OF FLUID SENSOR

CROSS-REFERENCE TO RELATED APPLICATIONS

This application is based on and claims priority to Japanese Patent Application No. 2018-121108 filed on Jun. 26, 2018 and Japanese Patent Application No. 2019-111469 filed on Jun. 14, 2019, the entire contents of which are incorporated herein by reference.

BACKGROUND OF THE INVENTION

1. Field of the Invention

The present invention relates to a fluid sensing apparatus and a method for detecting failures of a fluid sensor.

2. Description of the Related Art

Conventionally, a fluid sensing apparatus including a fluid sensor for detecting a flow (flow rate, flow velocity, direction, etc.) of a fluid such as air is known. As such a fluid sensor, a thermal fluid sensor is known. Thermal fluid sensors include thermistor-based fluid sensors and MEMS-based (Micro-Electro-Mechanical Systems) fluid sensors.

A thermistor-type fluid sensor is configured by disposing a heated thermistor in a flow path. In the thermistor, the resistance value increases as heat is taken away by the fluid flowing in the flow path. The rate of increase of this resistance value changes depending on the flow of fluid, and, therefore, the flow of fluid can be detected by measuring the resistance value of the thermistor.

The MEMS-type fluid sensor is configured by providing a heater on a membrane (thin film structure) formed on a sensor chip, and disposing temperature detectors (resistors) on the upstream side and the downstream side of the heater. As the fluid, which is the detection target, flows on the membrane, a temperature difference occurs between the upstream side and the downstream side of the heater, according to the flow of the fluid. By detecting this temperature difference with two temperature detectors disposed on the upstream side and the downstream side, the flow of the fluid can be detected.

Techniques for detecting failures of fluid sensors have been proposed.

For example, there is known a technique of using a self-heating thermistor to detect whether a fluid is flowing normally in a flow path, and determining the state of the flow path based on the slope at the time of rising when the temperature of the self-heating thermistor is raised (see, e.g., Patent Document 1).

There is also known a technique of configuring a bridge circuit with a temperature detector disposed on a membrane and a reference resistor disposed outside the membrane, and detecting the output of the bridge circuit, thereby detecting a failure of the membrane (see, e.g., Patent Document 2).

Patent Document 1: Japanese Translation of PCT International Application Publication No. JP-T-2016-510879

Patent Document 2: Japanese Unexamined Patent Application Publication No. 2004-257870

In a conventional thermal fluid sensor, the sensor output may vary due to foreign matter adhering to the sensor. However, when the sensor output varies, it is difficult to determine whether this variation in the sensor output is caused by foreign matter adhering to the sensor or by the actual changes in the flow of the fluid.

The technique described in Patent Document 1 is for determining the state of the flow path, and, therefore, a failure caused by adhesion of foreign matter is not considered in the first place. The technique described in Patent Document 2 is for detecting a disconnection caused by the breakage of the membrane, and a failure caused by adhesion of foreign matter is not considered.

Thermal fluid sensors are inexpensive, but are used directly in contact with the fluid that is the detection target, which raises concerns about failures including erroneous detections caused by adhesion of foreign matter. For this reason, the detection target has been limited to clean air or inert gas, having little concern for failure caused by adhesion of foreign matter.

SUMMARY OF THE INVENTION

Embodiments of the present invention can provide a thermal fluid sensing apparatus and a method for detecting failures of a fluid sensor that can detect failures caused by adhesion of foreign matter.

According to one aspect of embodiments of the present invention, there is provided a fluid sensing apparatus including a fluid sensor configured to detect a temperature distribution on a detection surface caused by heating, and output a signal value corresponding to a flow of a fluid; a falling time counting unit configured to count a falling time of the signal value after stopping the heating; and a failure determining unit configured to perform failure determination based on the falling time.

BRIEF DESCRIPTION OF THE DRAWINGS

FIGS. 18A to 18D are diagrams illustrating equivalent circuits when each switch is turned on;

FIG. 23 is a diagram illustrating calculated values of a falling time when a fluid sensor is normal;

FIG. 26 is a diagram illustrating calculated values of a falling time when soil adheres as foreign matter on a fluid sensor;

FIG. 29 is a diagram illustrating calculated values of a falling time when water adheres to a fluid sensor as a foreign matter.

DESCRIPTION OF THE PREFERRED EMBODIMENTS

Figure 1:
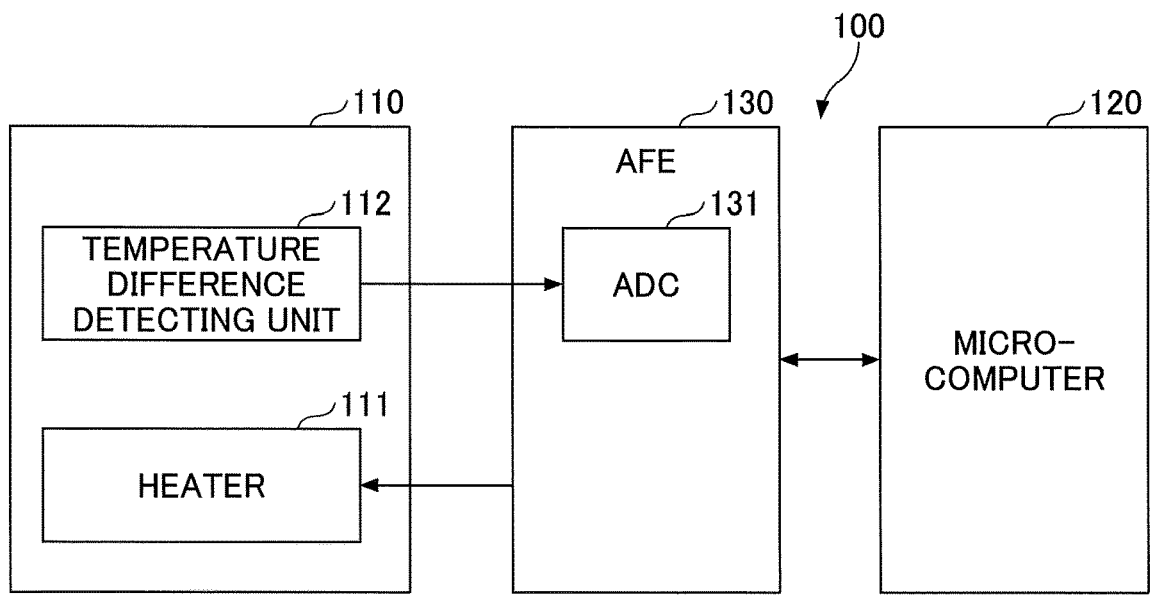
FIG. 1 is a diagram illustrating a schematic configuration of a fluid sensing apparatus according to a first embodiment.

Hereinafter, embodiments of the present invention will be described with reference to drawings. In the drawings, the same elements are denoted by the same reference numerals and duplicate descriptions may be omitted.

In the present application, a failure includes not only the case where the fluid sensor becomes inoperable due to a disconnection, etc., but also the case where the sensor output varies due to adhesion of foreign matter, etc., and the fluid flow is erroneously detected.

First Embodiment

Schematic Configuration of Fluid Sensing Apparatus—First Embodiment

FIG. 1 is a diagram illustrating a schematic configuration of a fluid sensing apparatus according to a first embodiment.

In FIG. 1, a fluid sensing apparatus 100 includes a fluid sensor 110, a microprocessor (hereinafter referred to as a microcomputer) 120, and an analog front end (AFE) circuit 130. The fluid sensor 110 is a sensor chip that includes a heater 111 and a temperature difference detecting unit 112. The heater 111 is a heating unit that generates heat, thereby heating the fluid (air, gas, etc.) on a membrane 20t, which will be described later, and causing a temperature distribution. The temperature difference detecting unit 112 detects a temperature difference that occurs between the upstream side and the downstream side of the heater 111, in at least one direction, and outputs a signal value corresponding to the temperature difference.

The microcomputer 120 is an arithmetic control device that performs driving control of the fluid sensor 110 via the AFE circuit 130 and arithmetic processing based on output signals from the fluid sensor 110. Note that a digital signal processing (DSP) circuit may be used instead of the microcomputer.

The AFE circuit 130 drives the heater 111 based on control from the microcomputer 120. In the present embodiment, the AFE circuit 130 drives the heater 111 by constant current driving for supplying a constant current to a heat generating resistor 40 (see FIG. 3A, etc.) that constitutes the heater 111.

In addition, the AFE circuit 130 is provided with an ADC (Analog-to-Digital Converter) 131 that converts an analog output signal input from the temperature difference detecting unit 112 to a digital signal.

The fluid sensing apparatus 100 may be used, for example, to control the flow in air conditioning equipment or to control the flow of air within an engine of an automobile.

Figure 2:
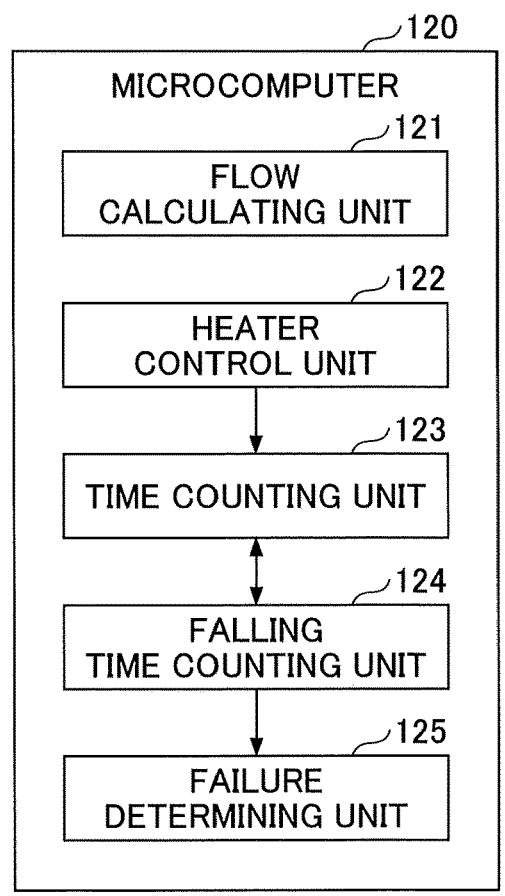
FIG. 2 is a functional block diagram illustrating functions of a microcomputer.

FIG. 2 is a functional block diagram illustrating functions of the microcomputer 120.

The microcomputer 120 includes a flow calculating unit 121, a heater control unit 122, a time counting unit 123, a falling time counting unit 124, and a failure determining unit 125. For example, the microcomputer 120 reads a program stored in a memory (not illustrated) and performs processing based on the read program, thereby implementing each functional unit.

As will be described in detail below, the flow calculating unit 121 calculates the flow of the fluid (flow rate, flow velocity, direction, etc.) based on the output signal of the temperature difference detecting unit 112. The heater control unit 122 controls the ON/OFF, etc., of the heater 111. The time counting unit 123 is a timer function that counts the elapsed time from a specified time point. The falling time counting unit 124 counts the falling time of the output signal of the temperature difference detecting unit 112 after the heater 111 is turned off (heating is stopped). The failure determining unit 125 determines the failure of the fluid sensor 110 based on the falling time counted by the falling time counting unit 124.

Structure of Fluid Sensor

Figure 3A:
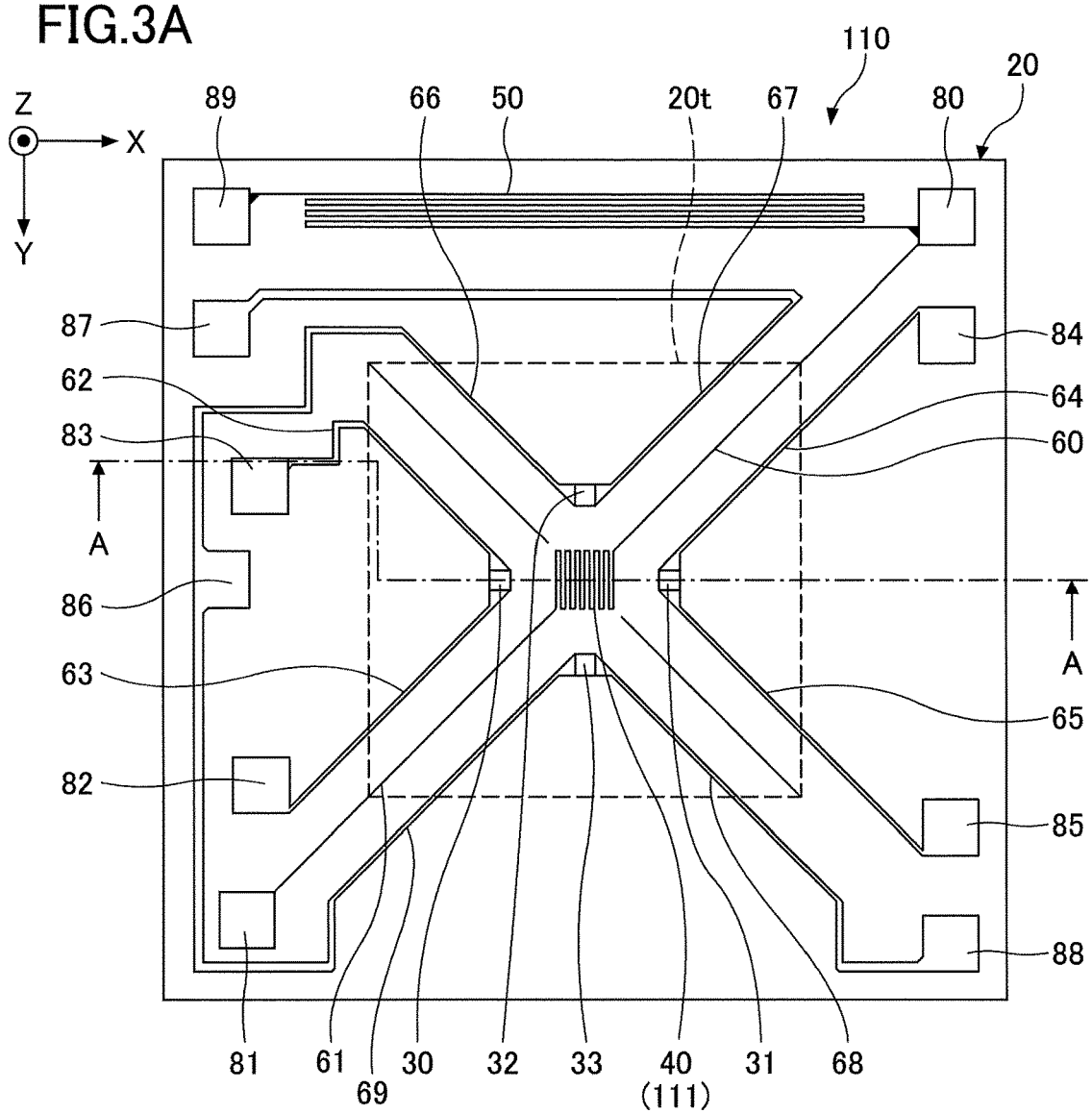
FIGS. 3A and 3B are diagrams illustrating a structure of a fluid sensor.
Figure 3B:
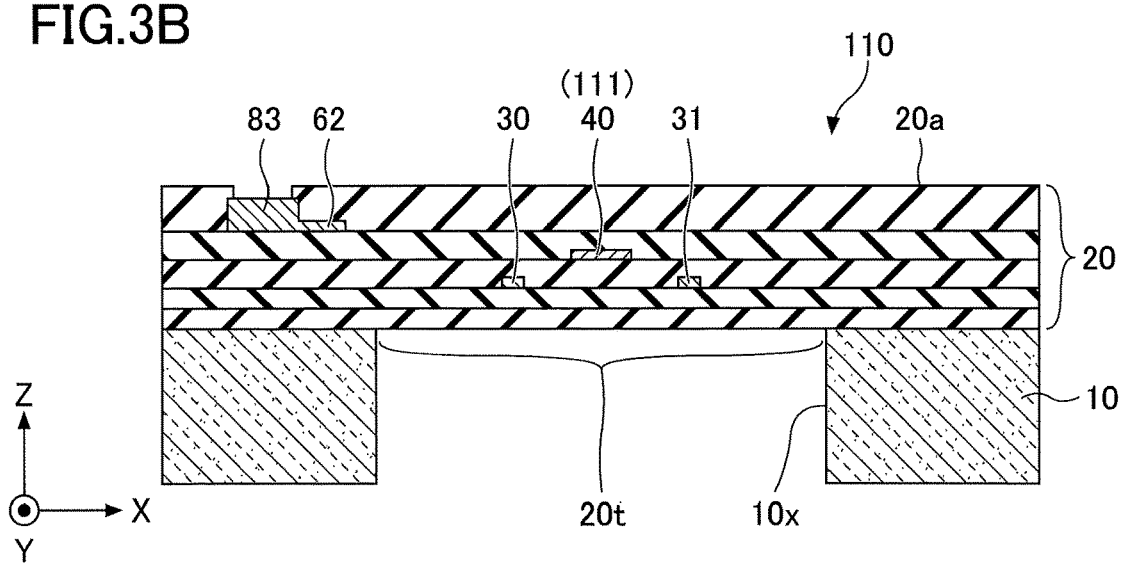

Next, the structure of the fluid sensor 110 will be described. FIGS. 3A and 3B are diagrams illustrating a structure of the fluid sensor 110; FIG. 3A is a planar perspective view and FIG. 3B is a cross-sectional view along the A-A line of FIG. 3A.

The fluid sensor 110 includes a semiconductor substrate 10, a laminated structure part 20, X-axis temperature detectors 30 and 31, Y-axis temperature detectors 32 and 33, the heat generating resistor 40, a temperature measurement resistor 50, wirings 60 to 69, and bonding pads (hereinafter referred to as pads) 80 to 89.

The semiconductor substrate 10 is a frame-like silicon substrate having an opening 10x. The laminated structure part 20 is formed by laminating a plurality of insulating films, and is provided on the semiconductor substrate 10 so as to occlude the opening 10x. The planar shape of the laminated structure part 20 is, for example, a square. In the laminated structure part 20, the region above the opening 10x is referred to as the membrane (thin film structure) 20t. The thickness of the laminated structure part 20 is approximately 0.5 μm to 5 μm.

The planar shape of the membrane 20t is, for example, a square. The membrane 20t is not in contact with the semiconductor substrate 10, and, therefore, the heat capacity is small and the temperature is easily raised. The top surface of the membrane 20t is a detection surface for detecting the flow of the fluid that is the detection target.

Note that in FIGS. 3A and 3B, the axes parallel to the two sides orthogonal to each other of the laminated structure part 20 are the X-axis and the Y-axis, and the direction orthogonal to the X-axis and the Y-axis is the Z-axis.

The laminated structure part 20 is provided with the X-axis temperature detectors 30 and 31 and the Y-axis temperature detectors 32 and 33. In addition, the wirings 60 to 69 and the pads 80 to 89 are provided on the top of the laminated structure part 20. The heat generating resistor 40, the X-axis temperature detectors 30 and 31, the Y-axis temperature detectors 32 and 33, and the temperature measurement resistor 50 are each connected to a predetermined wiring via vertical wiring.

The X-axis temperature detectors 30 and 31 are formed on a line in the X-axis direction passing through the center of the membrane 20t. The Y-axis temperature detectors 32 and 33 are formed on a line in the Y-axis direction passing through the center of the membrane 20t. The X-axis temperature detectors 30 and 31 detect a temperature difference with respect to the X-axis direction as a difference in the resistance value. The Y-axis temperature detectors 32 and 33 detect a temperature difference with respect to the Y-axis direction as a difference in the resistance value. Each of the temperature detectors 30 to 33 is a resistor formed by vanadium oxide or the like and is included in the temperature difference detecting unit 112.

The X-axis temperature detector 30 is connected to the pad 83 via the wiring 62 and is connected to the pad 82 via the wiring 63. The X-axis temperature detector 31 is connected to the pad 84 via the wiring 64 and is connected to the pad 85 via the wiring 65.

The pads 82 and 84 are externally connected. The pads 83 and 85 are externally connected to the GND and the power source, respectively. Accordingly, the X-axis temperature detectors 30 and 31 are connected in series between the GND and the power source, and an intermediate potential is obtained from the connection portion of the pads 82 and 84.

The Y-axis temperature detector 32 is connected to the pad 87 via the wiring 67 and is connected to the pad 86 via the wiring 66. The pad 86 is connected to the Y-axis temperature detector 33 via the wiring 69, and the Y-axis temperature detector 33 is connected to the pad 88 via the wiring 68.

The pads 87 and 88 are externally connected to the GND and power source, respectively. Accordingly, the Y-axis temperature detectors 32 and 33 are connected in series between the GND and the power source, and an intermediate potential is obtained from the pad 86.

The heat generating resistor 40 is connected to the pad 80 via the wiring 60 and is connected to the pad 81 via the wiring 61. When a voltage is applied between the pad 80 and the pad 81, a current flows to the heat generating resistor 40 to generate heat. The heat generating resistor 40 is formed of platinum (Pt), nichrome (NiCr), polysilicon (p-Si), and the like.

The temperature measurement resistor 50 is connected between the pad 80 and the pad 89. The temperature measurement resistor 50 is formed of platinum (Pt), nichrome (NiCr), polysilicon (p-Si), and the like.

The X-axis temperature detectors 30 and 31 and Y-axis temperature detectors 32 and 33 are disposed in a point-symmetric manner with respect to the heat generating resistor 40. Specifically, the heat generating resistor 40 is disposed at the center of the membrane 20t. In the present embodiment, the temperature detectors 30 to 33 are disposed at an equal distance from the heat generating resistor 40.

In this manner, the fluid sensor 110 is a sensor element that detects the temperature distribution on the detection surface caused by heating, and outputs a signal value (in the above-described configuration, an intermediate potential) corresponding to the flow of fluid.

Circuit Configuration—First Embodiment

Figure 4:
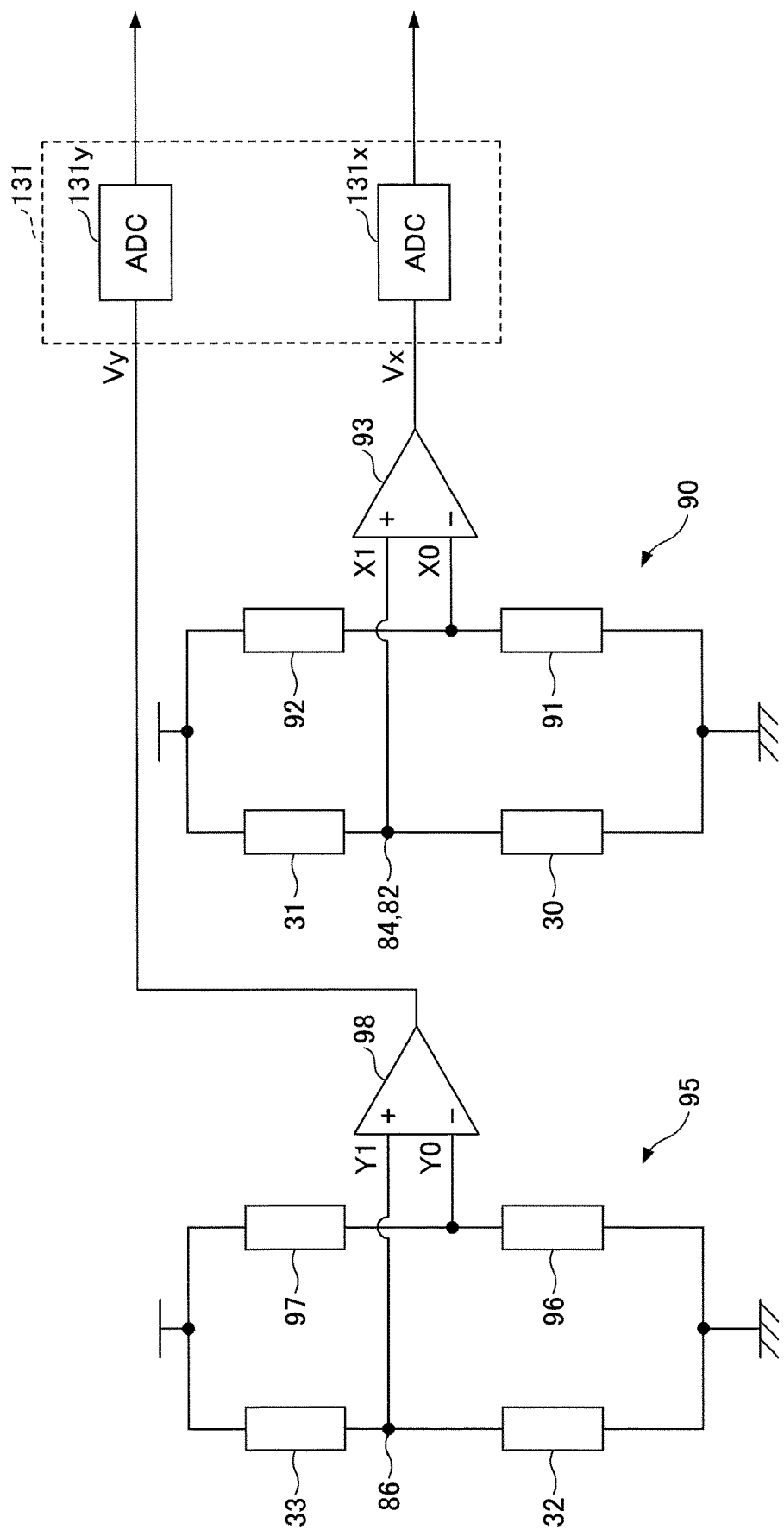
FIG. 4 is a circuit diagram illustrating a configuration of a bridge circuit.

Next, a bridge circuit including the temperature detectors will be described. FIG. 4 is a circuit diagram illustrating a configuration of a bridge circuit.

In FIG. 4, a first bridge circuit 90 includes the X-axis temperature detectors 30 and 31, reference resistors 91 and 92, and a sensor amplifier 93. A second bridge circuit 95 includes the Y-axis temperature detectors 32 and 33, reference resistors 96 and 97, and a sensor amplifier 98.

The X-axis temperature detectors 30 and 31 are connected in series between the GND and the power source, and a first intermediate potential X1 is obtained from the connection portion between the pad 82 and the pad 84. The reference resistors 91 and 92 are provided outside the fluid sensor 110 and are configured to be less susceptible to the fluid that is the detection target. The reference resistors 91 and 92 are resistors formed of vanadium oxide or the like, similar to the temperature detectors 30 to 33 described above. The reference resistors 91 and 92 are connected in series between the GND and the power source, and a first reference potential X0 is obtained from the connection portion between the reference resistors 91 and 92.

The sensor amplifier 93 has a positive input terminal connected to the connection portion of the X-axis temperature detectors 30 and 31, and a negative input terminal connected to the connection portion of the reference resistors 91 and 92. That is, the first intermediate potential X1 and the first reference potential X0 are input to the sensor amplifier 93 to output a first sensor output signal Vx, which is an amplification signal obtained by amplifying the difference value (X1-X0) between the first intermediate potential X1 and the first reference potential X0. The first sensor output signal Vx is a signal corresponding to a difference in the resistance value of the X-axis temperature detectors 30 and 31.

The Y-axis temperature detectors 32 and 33 are connected in series between the GND and the power source, and a second intermediate potential Y1 is obtained from the pad 86, which is the connection portion between the Y-axis temperature detectors 32 and 33. The reference resistors 96 and 97 are provided outside the fluid sensor 110 and are configured to be less susceptible to the fluid. The reference resistors 96 and 97 are resistors formed of vanadium oxide or the like, similar to the temperature detectors 30 to 33 described above. The reference resistors 96 and 97 are connected in series between the GND and the power source, and a second reference potential Y0 is obtained from the connection portion of the reference resistors 96 and 97.

The sensor amplifier 98 has a positive input terminal connected to the pad 86 and a negative input terminal connected to the connection portion of the reference resistors 96 and 97. That is, the second intermediate potential Y1 and the second reference potential Y0 are input to the sensor amplifier 98 to output a second sensor output signal Vy, which is an amplification signal obtained by amplifying the difference value (Y1-Y0) between the second intermediate potential Y1 and the second reference potential Y0. The second sensor output signal Vy is a signal corresponding to the difference between the Y-axis temperature detectors 32 and 33.

The ADC 131 described above has a first ADC 131x and a second ADC 131y. The first sensor output signal Vx is input to the first ADC 131x. The second sensor output signal Vy is input to the second ADC 131y. The first ADC 131x converts the first sensor output signal Vx to a digital signal and outputs the digital signal. The second ADC 131y converts the second sensor output signal Vy to a digital signal and outputs the digital signal.

When the heater 111 is turned on and there is no flow of fluid in the X-axis direction, the signal value of the first sensor output signal Vx is ideally zero. When the fluid is flowing in the X-axis direction, the first sensor output signal Vx is a value corresponding to the flow of fluid in the X-axis direction.

Similarly, when the heater 111 is turned on and there is no flow of fluid in the Y-axis direction, the signal value of the second sensor output signal Vy is ideally zero. When the fluid is flowing in the Y-axis direction, the second sensor output signal Vy is a value corresponding to the flow of the fluid in the Y-axis direction.

The resistance value of the temperature detector or the reference resistor is drifted due to the temperature or aging degradation, and, therefore, usually, the first sensor output signal Vx and the second sensor output signal Vy are not zero even when the heater 111 is off and there is no flow of fluid, and an offset is caused.

As described above, the first and second bridge circuits 90 and 95 are circuits that output a difference between the aforementioned intermediate potential and the reference potential; however, the first and second bridge circuits 90 and 95 do not necessarily need to be provided, and the intermediate potential can be treated as a sensor output signal.

Fluid Detection Operation—First Embodiment

Next, a fluid detection operation of the fluid sensing apparatus 100 will be described. The fluid detection operation is based on control by the microcomputer 120. In starting the fluid detection operation, the microcomputer 120 first drives the heater 111 through the AFE circuit 130 at a constant current and supplies a constant current to the heat generating resistor 40, thereby causing the heat generating resistor 40 to generate heat. This causes the temperature of the membrane 20t to rise and the fluid present on the detection surface to be heated, thereby forming a temperature distribution.

The microcomputer 120 operates the ADC 131 and acquires the digitized first sensor output signal Vx and the digitized second sensor output signal Vy from the temperature difference detecting unit 112 described above. The flow calculating unit 121 calculates the flow (e.g., the flow velocity) in the X-axis direction on the detection surface based on the first sensor output signal Vx. The flow calculating unit 121 calculates the flow (e.g., the flow velocity) in the Y-axis direction on the detection surface based on the second sensor output signal Vy.

When the fluid on the detection surface is not flowing in either the X-axis direction or the Y-axis direction, the temperature distribution is approximately uniform with reference to the center of the membrane 20t. In this case, the resistance value of the X-axis temperature detector 30 and the resistance value of the X-axis temperature detector 31 are approximately equal, and, therefore, the first intermediate potential X1 is approximately equal to the potential in the middle of the GND and the power source (the first reference potential X0). Similarly, in this case, the resistance value of the Y-axis temperature detector 32 and the resistance value of the Y-axis temperature detector 33 are approximately equal, and, therefore, the second intermediate potential Y1 is approximately equal to the potential in the middle of the GND and the power source (the second reference potential Y0). Accordingly, when the fluid on the detection surface is not flowing, Vx≈0 and Vy≈0 are satisfied.

On the other hand, when the fluid on the detection surface is flowing, the temperature distribution on the detection surface is deviated according to the flow of the fluid. When the fluid is flowing in the X-axis direction, a difference in the resistance value is caused between the X-axis temperature detector 30 and the X-axis temperature detector 31, and the first intermediate potential X1 changes. At this time, the first reference potential X0 does not change, and, therefore, the first sensor output signal Vx changes. Similarly, when the fluid is flowing in the Y-axis direction, a difference in the resistance value is caused between the Y-axis temperature detector 32 and the Y-axis temperature detector 33, and the second intermediate potential Y1 changes. At this time, the second reference potential Y0 does not change, and, therefore, the second sensor output signal Vy changes.

The flow calculating unit 121 may calculate the direction in which the fluid flows (flow direction), the flow rate, the flow velocity, and the like based on the magnitude and the positive-negative relationship of the first sensor output signal Vx and the second sensor output signal Vy. The flow calculating unit 121 may store, in advance, the relationship between the first sensor output signal Vx and the second sensor output signal Vy, and the flow direction, the flow rate, the flow velocity, or the like, as a table, and use this table when calculating each value.

Failure Detection Operation—First Embodiment

Next, a failure detection operation of the fluid sensing apparatus 100 will be described. The failure detection operation is based on control by the microcomputer 120. In this failure detection operation, a failure caused by adhesion of foreign matter onto the membrane 20t of the fluid sensor 110, is mainly detected. Specifically, a failure is detected based on a change in the thermal capacity due to the adhesion of foreign matter to the membrane 20t, and a change in the time constant of the sensor output signal (the first sensor output signal Vx and/or the second sensor output signal Vy). In the failure detection operation, the microcomputer 120 treats the signal value of the sensor output signal as a positive value.

Figure 5:
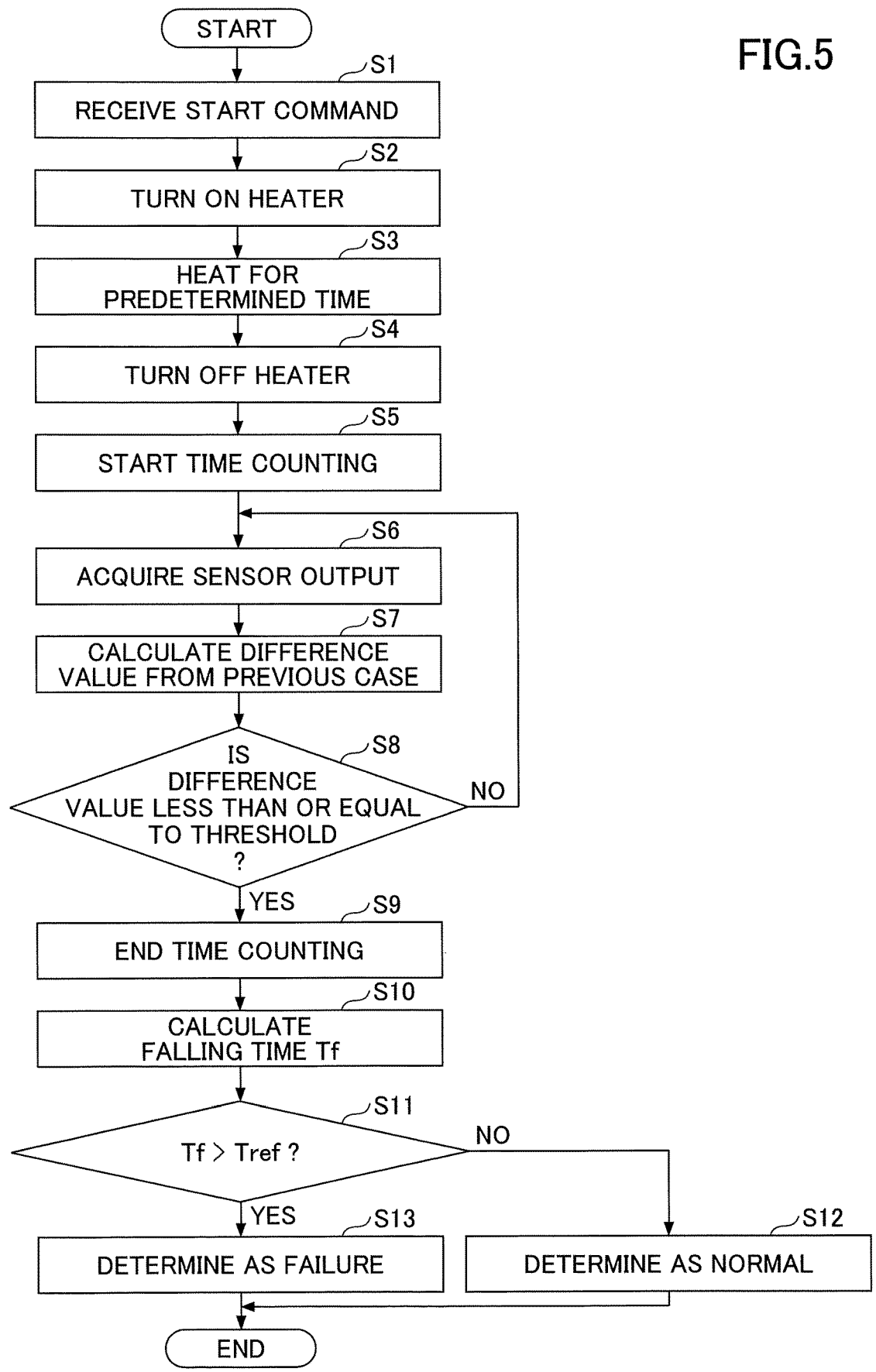
FIG. 5 is a flow chart illustrating a failure detection operation.
Figure 6:
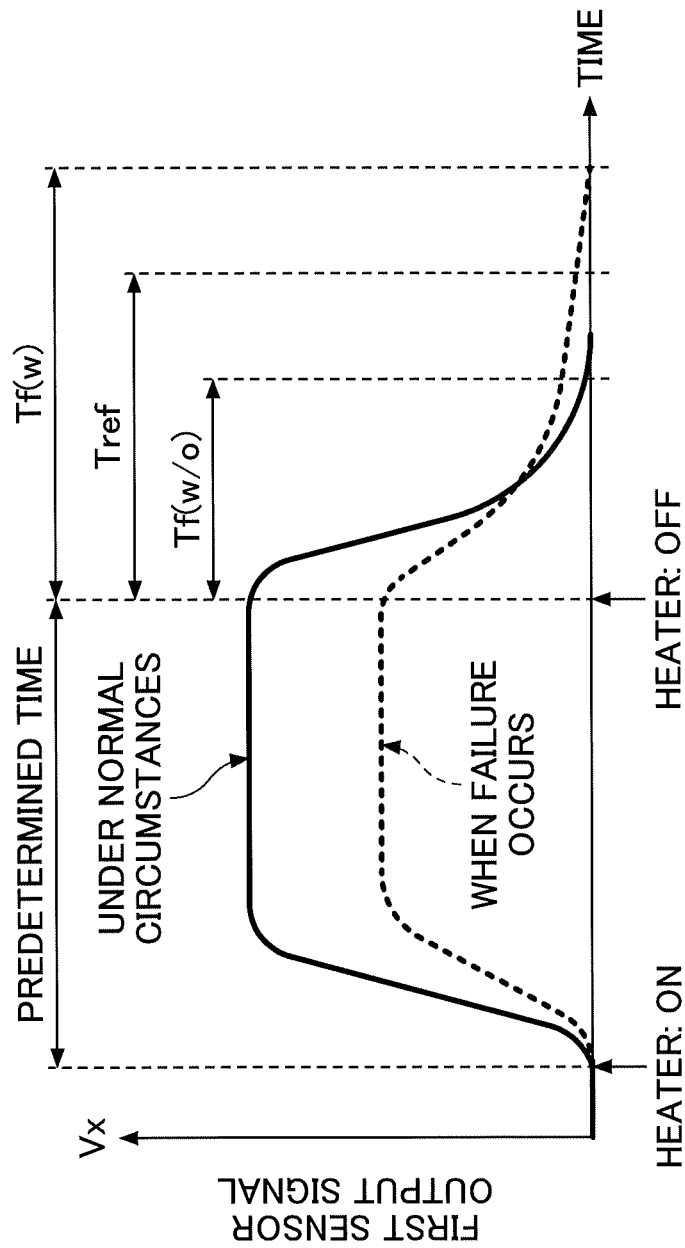
FIG. 6 is a graph illustrating a change in the first sensor output signal during a failure detection operation.

FIG. 5 is a flow chart illustrating a failure detection operation. FIG. 6 is a graph illustrating a change in the first sensor output signal Vx during a failure detection operation. In the present embodiment, failure detection is performed based on the first sensor output signal Vx.

Hereinafter, the processing of the microcomputer 120 when the failure detection operation is performed will be described with reference to FIGS. 5 and 6.

The microcomputer 120 receives a start command of the failure detection operation from outside (step S1). The start command is transmitted from an operation unit (not illustrated) operated by the user. When the microcomputer 120 receives the start command, the heater 111 is turned on by the heater control unit 122, and the heating by the heat generating resistor 40 is started (step S2). Accordingly, the first sensor output signal Vx starts to rise.

In an ideal state without the above-described offset or fluid flow, the temperature distribution caused by the heater 111 becomes uniform, and, therefore, the first sensor output signal Vx does not rise. However, usually, an offset and a fluid flow are not completely eliminated, and, therefore, the first sensor output signal Vx rises as soon as the heater 111 is turned on.

The microcomputer 120 then causes the heat generating resistor 40 to perform heating for a predetermined period of time (step S3). This predetermined time is sufficient for the temperature of the heat generating resistor 40 to rise and saturate. After the predetermined time has elapsed, the heater 111 is turned off by the heater control unit 122, and the heating by the heat generating resistor 40 is stopped (step S4). Accordingly, the first sensor output signal Vx starts to fall.

The microcomputer 120 turns off the heater 111 and starts to count the time by the time counting unit 123 (step S5). The falling time counting unit 124 acquires the first sensor output signal Vx from the fluid sensor 110 via the AFE circuit 130 during the time counting (step S6). The acquisition of the first sensor output signal Vx is performed at regular time intervals by repeating steps S6 to S8, and the signal value of the first sensor output signal Vx is stored in a memory (not illustrated).

When the first sensor output signal Vx is acquired, the falling time counting unit 124 calculates the difference value between the signal value acquired in the present case and the signal value acquired in the previous case (step S7). Specifically, the falling time counting unit 124 calculates a difference value ΔVx, which is a value obtained by subtracting the previous signal value from the present signal value.

Upon calculating the difference value ΔVx, the falling time counting unit 124 determines whether the difference value ΔVx is less than or equal to a threshold value (step S8). When the first difference value ΔVx is not less than or equal to the threshold value (step S8: NO), the processing returns to step S6, and the falling time counting unit 124 acquires the first sensor output signal Vx again.

On the other hand, when the first difference value ΔVx becomes less than or equal to the threshold value (step S8: YES), the falling time counting unit 124 ends the time counting by the time counting unit 123 (step S9). It is preferable that the threshold value corresponds to the variation width of the signal value when the first sensor output signal Vx falls sufficiently.

Subsequently, the falling time counting unit 124 calculates the time between the time when the time counting unit 123 starts the time counting and the time when the time counting ends, and sets the calculated value as the falling time Tf (step S10).

The failure determining unit 125 compares the falling time Tf calculated by the falling time counting unit 124 with the reference time Tref (step S11). When the falling time Tf is less than or equal to the reference time Tref (step S11: NO), the failure determining unit 125 determines that the fluid sensor 110 is normal (step S12). On the other hand, when the falling time Tf is greater than the reference time Tref (step S11: YES) the failure determining unit 125 determines that the fluid sensor 110 has failed (step S13). In FIG. 6, Tf(w/o) represents the falling time under normal circumstances, and Tf(w) represents the falling time under abnormal circumstances.

The reference time Tref is pre-set to a value by which it is possible to distinguish between the falling time Tf under normal circumstances and the falling time Tf when a failure has occurred, based on experiments, etc.

In this failure detection operation, failure determination is performed based on the first sensor output signal Vx. However, the failure determination may be performed based on the second sensor output signal Vy. Furthermore, the failure determination may be performed based on both the first sensor output signal Vx and the second sensor output signal Vy. In this case, for example, the above-described steps S5 and onward are performed for each of the first sensor output signal Vx and the second sensor output signal Vy, and when at least one of the first sensor output signal Vx and the second sensor output signal Vy is determined to be a failure, it is to be determined that the fluid sensor 110 has failed.

In step S1, the microcomputer 120 starts a failure detection operation in response to a start command input from outside; however, the microcomputer 120 may start a failure detection operation automatically based on a timer or the like.

Effects—First Embodiment

The time constant τ of the sensor output signal is generally represented by formula (1) below.

$$\tau = C/G \quad (1)$$

Here, C is the heat capacity (J/K) of the membrane 20t, and G is the thermal conductance (W/K).

According to formula (1) above, when foreign matter adheres to the membrane 20t, the heat capacity C increases due to the foreign matter, and the time constant τ increases. Thus, the falling time Tf becomes long.

For example, when the planar shape of the membrane 20t is a square in which each side is 600 μm, the thickness of the membrane 20t is 1 μm, the density is 2200 kg/m$^3$, and the specific heat is 745 J/kg·K, then the heat capacity C when no foreign matter is adhering is calculated as 5.9×10$^{-7}$ J/K. In this case, the time constant τ is approximately 30 ms.

The foreign matter adhering to the membrane 20t is, for example, sand grains. For example, when the weight of the sand grains is 1 μg, the heat capacity C of the membrane 20t including the sand grains is calculated to be 1.3×10$^{-6}$ J/K. In this case, the time constant τ is approximately 68 ms.

Thus, even when a small amount of foreign matter with a weight of 1 μg is adhering, the time constant T becomes a value of 2 times or more, indicating that the falling time Tf changes greatly.

Therefore, according to the fluid sensing apparatus 100 according to the present embodiment, by appropriately setting the reference time Tref, it becomes possible to detect a failure caused by adhesion of foreign matter, which could not be detected in the conventional technology.

The rising time of the sensor output signal changes with the change in the time constant τ described above, and, therefore, in principle, failure detection can be performed based on the rising time. However, the rising period after heater 111 is turned on is a period during which a temperature distribution is formed by heating, and, therefore, when there are variations in flow velocity, the sensor output signal tends to vary by being influenced by the variation in the flow velocity, and, therefore, it is difficult to accurately determine the rising time.

Figure 7:
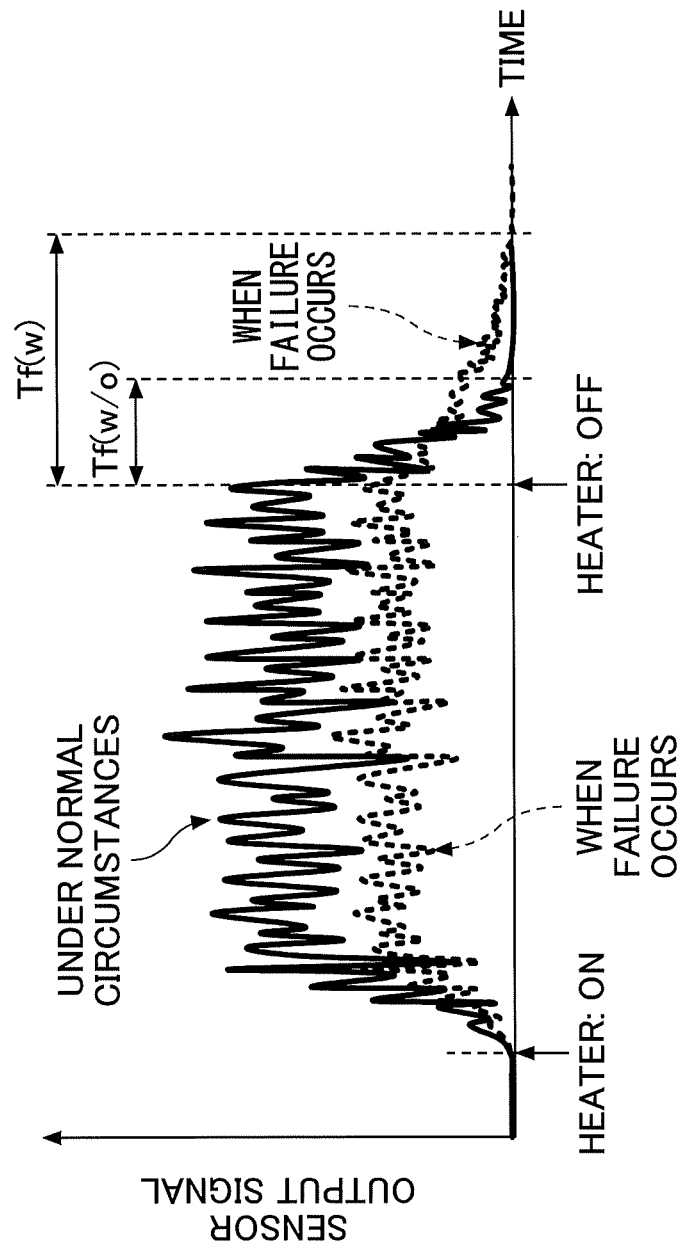
FIG. 7 is a graph illustrating the influence of variations in the flow velocity of the sensor output signal.

FIG. 7 is a graph schematically illustrating the influence of variations in the flow velocity of the sensor output signal. As illustrated in this graph, in a situation where the flow velocity is varying, it is difficult to accurately determine the rising time, because the sensor output signal tends to vary during the rising period. Conversely, in the falling period, the influence of the variation of the flow velocity is small, and the sensor output signal hardly varies, and, therefore, it is possible to accurately determine the falling time Tf.

Accordingly, as illustrated in the above-described embodiment, failure detection can be performed accurately by performing failure determination based on the falling time Tf of the sensor output signal.

In addition, the rising time and falling time Tf of the sensor output signal may vary depending on the flow velocity. It is considered that the rising time is the shortest when the flow velocity is zero, longer when the flow velocity increases, and varies within a certain range (e.g., 20 ms to 40 ms). Conversely, the falling time Tf is considered to be the longest when the flow velocity is zero, shorter when the flow velocity increases, and varies within a certain range.

Therefore, the reference time Tref is to be set based on the falling time Tf when the fluid sensor 110 is normal and the flow velocity is zero. That is, the reference time Tref is to be set within a range that is longer than the maximum falling time under normal circumstances and shorter than the falling time Tf when a failure occurs. The maximum falling time Tfm is to be measured at the time of shipment inspection, and the reference time Tref is to be set using this measurement result. Accordingly, when the falling time Tf changes due to the variation of the flow velocity, it is possible to prevent a situation of mistakenly determining that a failure has occurred, by the above-described failure detection operation.

As described above, according to the fluid sensing apparatus 100 of the present embodiment, a failure caused by adhesion of foreign matter can be detected. Therefore, the detection target is not limited to clean air or inert gas, etc., which is less susceptible to failures due to adhesion of foreign matter. Also, the fluid sensing apparatus 100 can be implemented by general configurations, such as sensor chips and microcomputers, and, therefore, the fluid sensing apparatus 100 can be manufactured at a low cost and is inexpensive. For this reason, the fluid sensing apparatus 100 can be applied in a variety of applications to a variety of fields. For example, in the field referred to as IoT (Internet of Things), a large number of sensors are required to be installed, and, therefore, the fluid sensing apparatus 100 is suitable for the IoT field.

Thus, the fluid sensing apparatus 100 can detect failures and is inexpensive, and is therefore more useful than an expensive sensor with fewer failures.

Modification Example of First Embodiment

Various modification examples of the fluid sensing apparatus according to the first embodiment are described below. In each modification example, the same configurations as those of the first embodiment are denoted by the same reference numerals and descriptions thereof are omitted.

Falling Time Counting Unit—Modification Example of First Embodiment

A modification example of the falling time counting unit 124 will be described. The method of counting the falling time Tf by the falling time counting unit 124 is not limited to the method illustrated in FIG. 5, and various modifications are possible.

In the first embodiment, the falling time counting unit 124 obtains the falling time Tf based on the difference value between two signal values, i.e., the signal value obtained in the present case and the signal value obtained in the previous case; however, the falling time Tf may be obtained based on three or more signal values. For example, when the difference value between the signal value obtained in the present case and the signal value obtained in the previous case, and the difference value between the signal value obtained in the previous case and the signal value obtained in the case before the previous case are both less than or equal to a threshold value, the time counting by the time counting unit 123 may be ended and the falling time Tf may be obtained.

Alternatively, a plurality of signal values may be averaged according to need. For example, after smoothing the change in the signal value by a moving average, the falling time Tf may be obtained.

Further, the falling time counting unit 124 may obtain the falling time Tf by determining that the signal value of the sensor output signal has decreased to a predetermined value, without using a difference value. This predetermined value is, for example, a predetermined fixed value. The signal value of the sensor output signal before the heater 111 is turned on, may be obtained as an initial value, and the initial value may be used as the predetermined value. That is, the signal value of the sensor output signal when the heater 111 is off may be the predetermined value.

Figure 8:
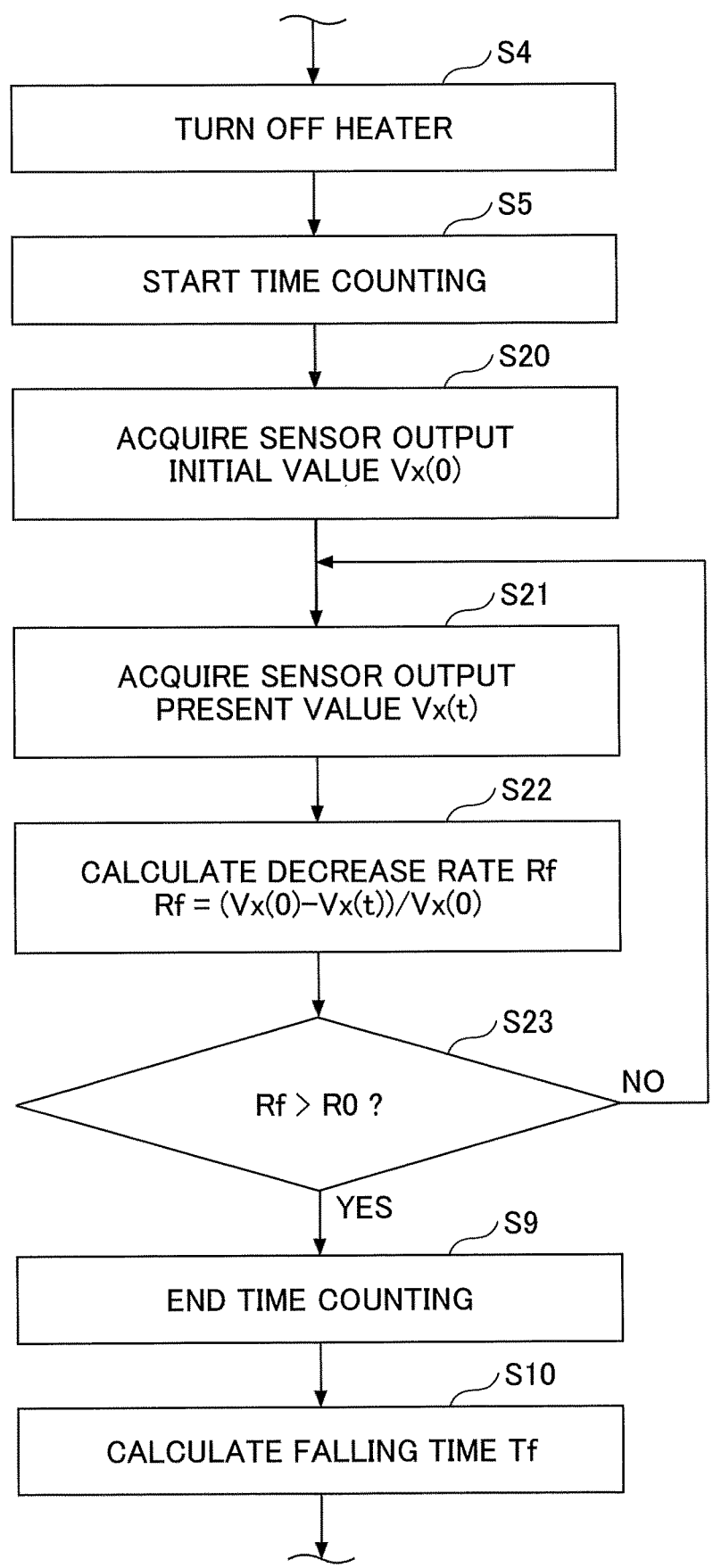
FIG. 8 is a diagram illustrating a modification example of the flow chart illustrated in FIG. 5.

Further, it is possible to obtain the falling time Tf based on the decrease rate of the sensor output signal. FIG. 8 is a diagram illustrating a modification example of the flow chart illustrated in FIG. 5. In the flow chart illustrated in FIG. 8, steps S6 to S8 of the flow chart illustrated in FIG. 5 are replaced by steps S20 to S22. Steps S1 to S3 and S11 to S13 are not illustrated.

In the present modification example, immediately after the heater 111 is turned off (step S4) and the time counting is started by the time counting unit 123 (step S5), the falling time counting unit 124 acquires the first sensor output signal Vx and stores the acquired signal value as the initial value Vx(0) in a memory that is not illustrated (step S20). The initial value Vx(0) may be acquired before the heater 111 is turned off.

The falling time counting unit 124 acquires the first sensor output signal Vx after the time counting is started and stores the acquired signal value as the present value Vx(t) in a memory (step S21). The falling time counting unit 124 calculates the decrease rate Rf based on the following formula (2) by using the initial value Vx(0) and the present value Vx(t) stored in the memory (step S22).

$$Rf=(Vx(0)-Vx(t))/Vx(0) \quad (2)$$

The falling time counting unit 124 compares the calculated decrease rate Rf with a predetermined value R0 and determines whether the decrease rate Rf is greater than the predetermined value R0 (step S23). Here, the predetermined value R0 is, for example, set to "0.632," which is a value used in the calculation of the time constant. However, the predetermined value R0 is not limited to this value, and may be changed appropriately.

When the decrease rate Rf is less than or equal to the predetermined value R0 (step S23: NO), the falling time counting unit 124 returns the processing to step S21 and acquires the first sensor output signal Vx again. Conversely, when the decrease rate Rf becomes greater than the predetermined value R0 (step S23: YES), the falling time counting unit 124 ends the time counting by the time counting unit 123 (step S9).

Subsequently, the falling time counting unit 124 calculates the time between the time when the time counting unit 123 starts the time counting and the time when the time counting ends, and sets the calculated value as the falling time Tf (step S10). The subsequent steps are similar to those of the flow chart illustrated in FIG. 5.

Arrangement of Temperature
Detectors—Modification Example of First
Embodiment

Next, a modification example of the arrangement of the temperature detectors will be described. In the first embodiment, the X-axis temperature detectors 30 and 31, and the Y-axis temperature detectors 32 and 33 are positioned at equal distances from the center (heater 111) of the membrane 20t, respectively, but at least one temperature detector may be displaced from such a position.

Figure 9:
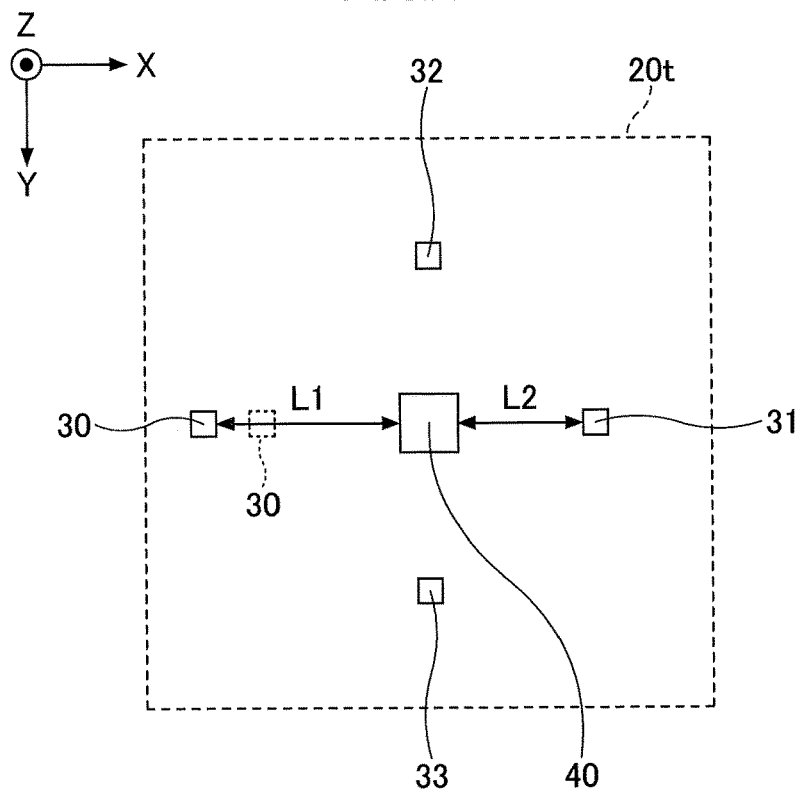
FIG. 9 is a diagram illustrating an example in which one X-axis temperature detector is displaced from the position of the first embodiment illustrated by a dashed line.

FIG. 9 is a diagram illustrating an example in which one X-axis temperature detector 30 is displaced from the position of the first embodiment, as illustrated by dashed lines. In this example, a distance L1 from the heater 111 to the X-axis temperature detector 30 is longer than a distance L2 from the heater 111 to the X-axis temperature detector 31. Accordingly, even when there is no fluid flow and the temperature distribution is uniform, a difference in the resistance value will occur due to the temperature difference between the X-axis temperature detectors 30 and 31. The above-described flow calculating unit 121 may calculate the flow of fluid with respect to the X-direction by taking this temperature difference into consideration.

Thus, in the example illustrated in FIG. 9, even when there is no fluid flow, by turning on the heater 111, a temperature difference occurs between the X-axis temperature detectors 30 and 31 and the first sensor output signal Vx rises. Accordingly, the falling time counting unit 124 can reliably measure the falling time Tf based on the first sensor output signal Vx even when there is no fluid flow.

This configuration is not limited to the X-axis temperature detectors 30 and 31. The Y-axis temperature detectors 32 and 33 may be positioned at different distances from the heater 111.

Temperature Detectors for Failure
Detection—Modification Example of First
Embodiment In the first embodiment, failure detection is performed by using temperature detectors for detecting a flow (X-axis temperature detectors 30 and 31, and Y-axis temperature detectors 32 and 33), but a temperature detector for detecting failures may be provided separately.

Figure 10:
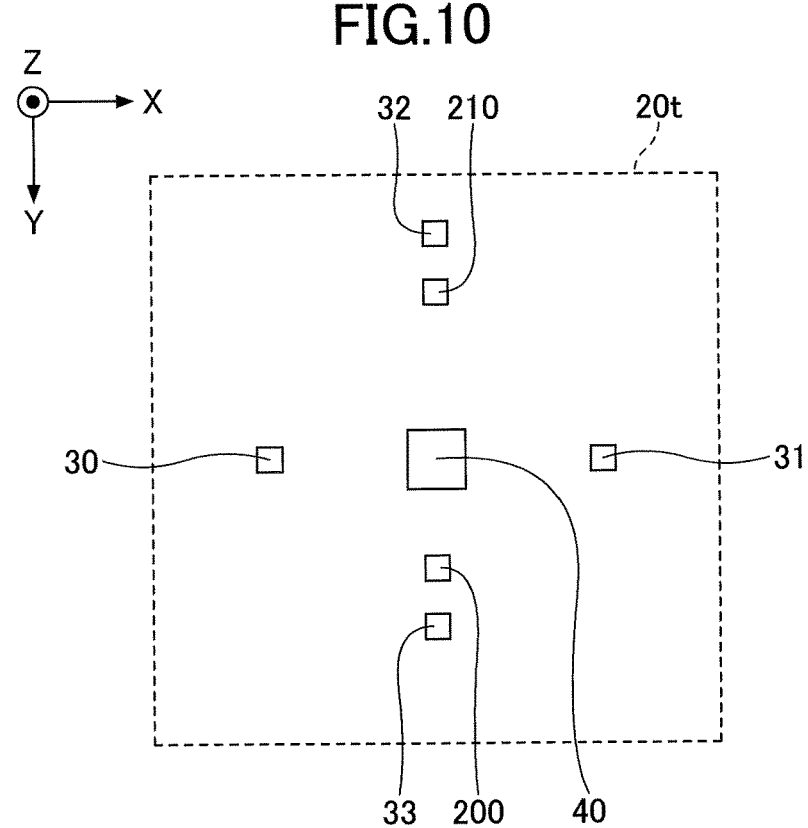
FIG. 10 is a diagram illustrating an example of an arrangement of temperature detectors for detecting failures.

FIG. 10 is a diagram illustrating an example of an arrangement of temperature detectors 200 and 210 for detecting failures. In this example, the temperature detectors 200 and 210 for detecting failures are formed on a Y-axis line passing through the center of the membrane 20t. The temperature detectors 200 and 210, and two reference resistors and a sensor amplifier (not illustrated) form a bridge circuit similar to that of FIG. 4. The falling time counting unit 124 may calculate the falling time Tf based on the sensor output signal output from this bridge circuit.

Furthermore, it may also be considered to displace the position of one of the temperature detectors 200 and 210 for detecting failures, so that the temperature detectors 200 and 210 are disposed asymmetrically relative to the center of the membrane 20t, so that failure detection is reliably performed.

Figure 11:
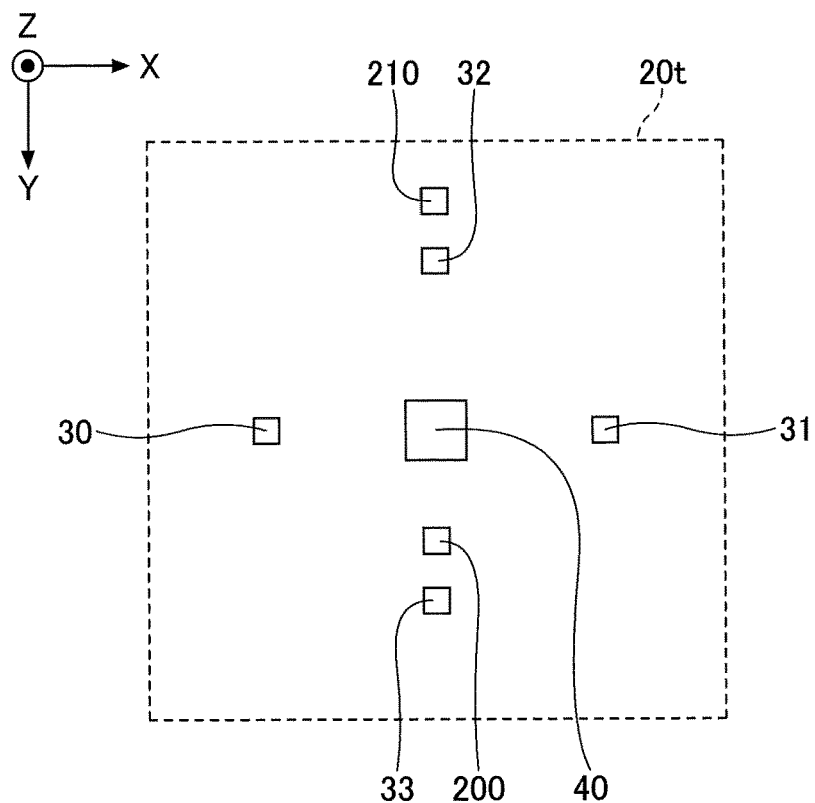
FIG. 11 is a diagram illustrating an example where the arrangement of the temperature detectors for detecting failures is asymmetrical.

FIG. 11 is a diagram illustrating an example in which the temperature detector 210 for detecting failures is displaced from the position illustrated in FIG. 10, and the arrangement of the temperature detectors 200 and 210 is asymmetrical. In this example, the distance from the heater 111 to the temperature detector 210 is greater than the distance from the heater 111 to the temperature detector 200. In this case, even when there is no fluid flow, a temperature difference between the temperature detectors 200 and 210 is caused by turning on the heater 111. Therefore, the falling time counting unit 124 can reliably count the falling time Tf.

The temperature detectors 200 and 210 for detecting failures are not limited to being disposed in the Y-axis direction but may be disposed in the X-axis direction. A temperature detector for detecting failures may also be provided in both the X-axis direction and the Y-axis direction.

Heater Failure Detection—Modification Example of
First Embodiment

In the first embodiment, as failure detection, adhesion of foreign matter on the membrane 20t is detected, but in addition, a failure of the heater 111 can be detected.

Figure 12:
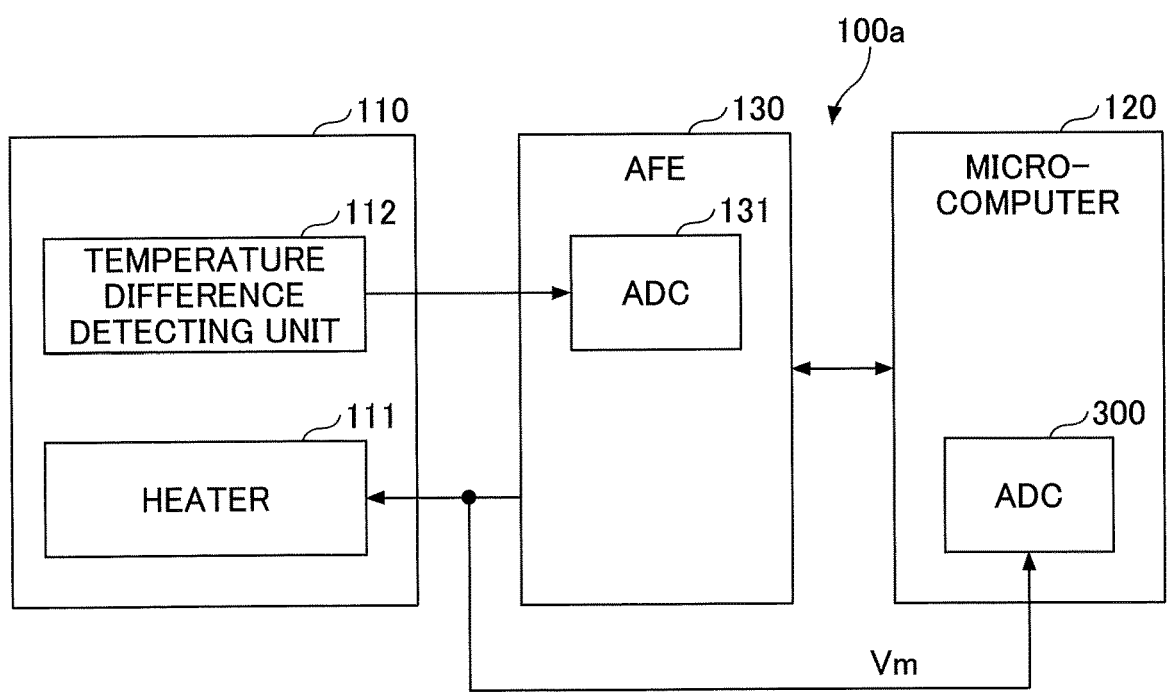
FIG. 12 is a diagram illustrating a schematic configuration of a fluid sensing apparatus capable of detecting a failure of a heater.

FIG. 12 is a diagram illustrating a schematic configuration of a fluid sensing apparatus 100a capable of detecting a failure of the heater 111. In the fluid sensing apparatus 100a, the output voltage when the AFE circuit 130 drives the heater 111 at a constant current, is input to the microcomputer 120 as a monitor voltage Vm. The microcomputer 120 is provided with an ADC 300 for converting an analog monitor voltage Vm to a digital signal.

The microcomputer 120 holds a signal value of the monitor voltage Vm obtained when the heater 111 is turned on under normal circumstances, at the time of shipment inspection, etc. The microcomputer 120 can detect a failure of the heater 111, such as disconnection, by comparing the signal value of the monitor voltage Vm obtained when the heater 111 is on, with the signal value under normal circumstances.

Figure 13:
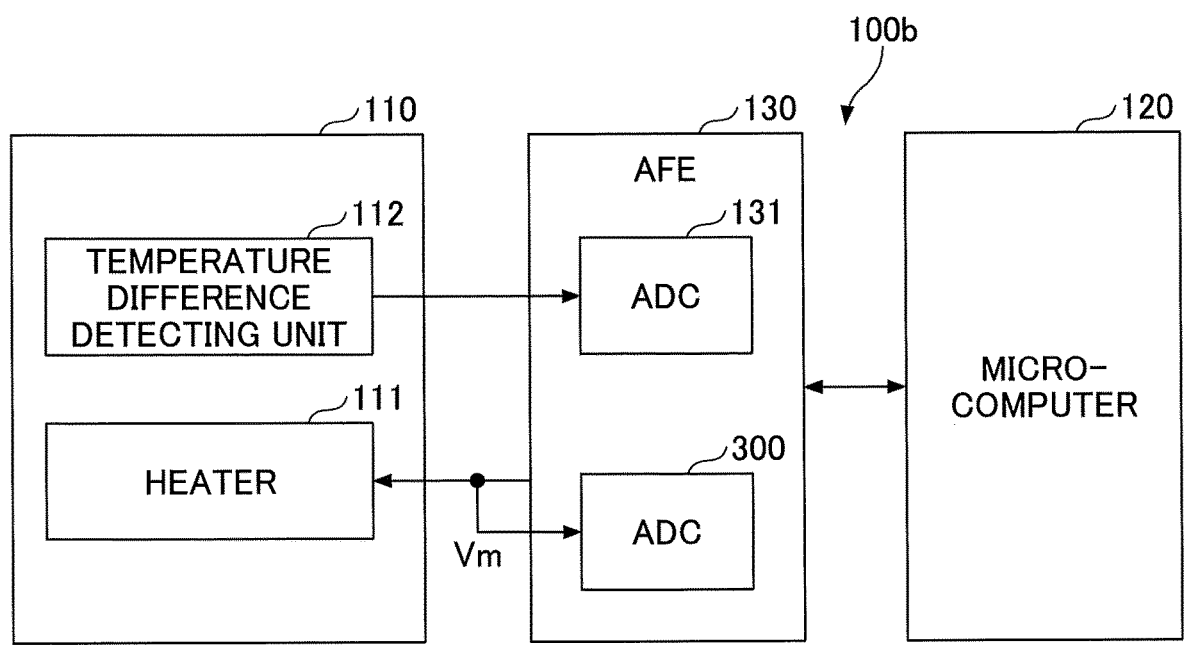
FIG. 13 is a diagram illustrating a modification example of the fluid sensing apparatus illustrated in FIG. 12.

FIG. 13 is a diagram illustrating a modification example of a fluid sensing apparatus illustrated in FIG. 12. In FIG. 13, in a fluid sensing apparatus 100b, the ADC 300 for converting the monitor voltage Vm to a digital signal is provided in the AFE circuit 130. In this modification example, the monitor voltage Vm digitized by the ADC 300 is input from the AFE circuit 130 to the microcomputer 120. The failure detection operation of the heater 111 is the same as described above.

Figure 14:
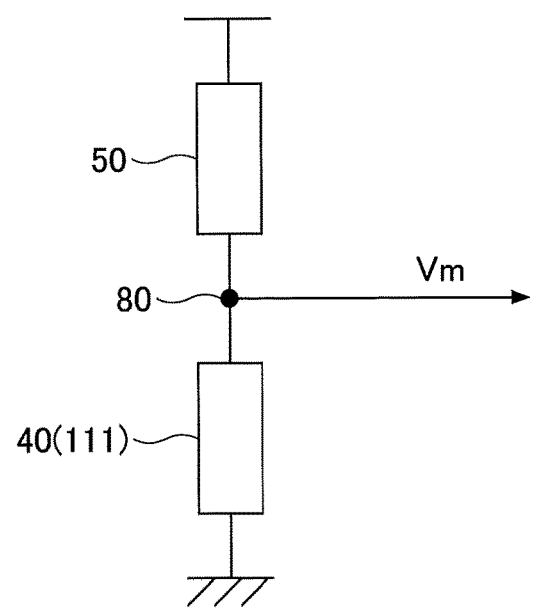
FIG. 14 is a diagram illustrating a voltage application method for driving a heater at a constant voltage.

In the first embodiment, the driving method of the heater 111 is constant current driving, but the driving method may be replaced by constant voltage driving. FIG. 14 is a diagram illustrating a voltage application method for driving the heater 111 at a constant voltage.

In this example, the heat generating resistor 40 serving as the heater 111 and the temperature measurement resistor 50 serving as a detection resistor are connected in series, and the GND is connected to the heat generating resistor 40 side and the constant voltage power source is connected to the temperature measurement resistor 50 side. Specifically, in FIG. 3A, the pad 81 is connected to the GND and the pad 89 is connected to a constant voltage power source. The monitor voltage Vm is obtained from the pad 80. The monitor voltage Vm is digitized with the ADC 300 illustrated in FIG. 12 or FIG. 13. The failure detection operation of the heater 111 is the same as described above.

Figure 15:
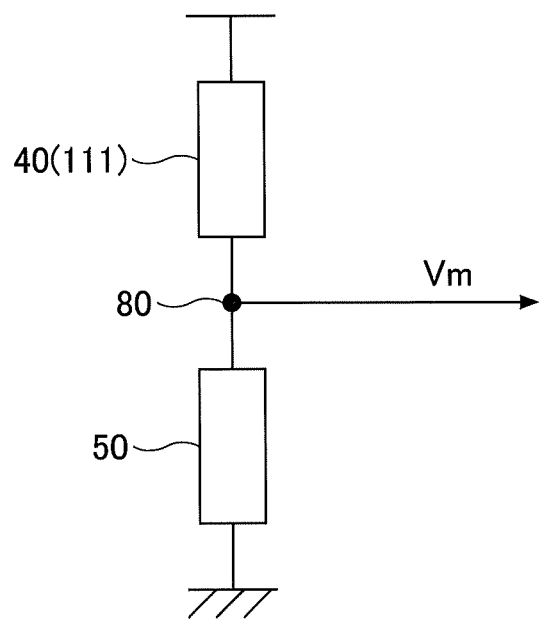
FIG. 15 is a diagram illustrating another voltage application method for driving a heater at a constant voltage.

FIG. 15 is a diagram illustrating another voltage application method for driving a heater 111 at a constant voltage. In this example, the heat generating resistor 40 and the temperature measurement resistor 50 are connected in series, and the GND is connected to the temperature measurement resistor 50 side and a constant voltage power source is connected to the heat generating resistor 40 side. Specifically, in FIG. 3A, the pad 89 is connected to the GND and the pad 81 is connected to a constant voltage power source. The monitor voltage Vm is obtained from the pad 80. The monitor voltage Vm is digitized with the ADC 300 illustrated in FIG. 12 or FIG. 13. The failure detection operation of the heater 111 is the same as described above.

In the example illustrated in FIGS. 14 and 15, failure detection of the heater 111 is performed based on the monitor voltage Vm generated in the pad 89 that is the connection portion between the heat generating resistor 40 and the temperature measurement resistor 50. However, failure detection of the heater 111 can be performed based on the potential difference occurring in the temperature measurement resistor 50.

Figure 16:
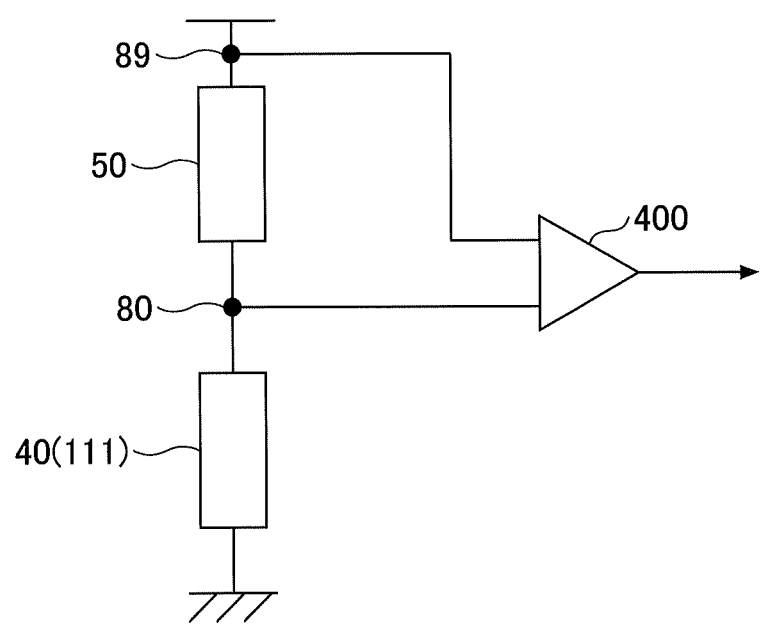
FIG. 16 is a diagram illustrating an example of failure detection of a heater based on a potential difference occurring in a detection resistor.

FIG. 16 is a diagram illustrating an example of failure detection of the heater 111 based on a potential difference occurring in the temperature measurement resistor 50 serving as a detection resistor. In the figure, a comparator 400 is provided. The comparator 400 has one input terminal connected to the pad 89 and the other input terminal connected to the pad 80.

In this example, the pad 81 illustrated in FIG. 3A is connected to the GND. The comparator 400 outputs a digital signal of "0" or "1". For example, the comparator 400 outputs "0" when the heater 111 is normal, and outputs "1" when the heater 111 fails and the potential of the pad 80 changes. In this example, the ADC 300 need not be provided. The output signal of the comparator 400 may be input to the microcomputer 120 directly or via the AFE circuit 130. The microcomputer 120 determines that the heater 111 has failed when an output signal representing "1" is input from the comparator 400.

Other Failure Detections—Modification Example of First Embodiment

As another type of failure detection, it is possible to detect the failure of the temperature difference detecting unit 112. Specifically, the signal value of the sensor output signal (the first sensor output signal Vx and the second sensor output signal Vy) when the heater 111 is off, may be acquired under normal circumstances, such as at the time of shipment inspection, and it may be determined that the temperature difference detecting unit 112 has failed when the signal value changes more than a certain amount from the normal state. By performing failure determination when the heater 111 is off, failure determination may be performed without being affected by the fluid.

It is also possible to detect a disconnection caused by the cracking of the membrane 20t, based on the result of the failure determination of the heater 111 or the result of the failure determination of the temperature difference detecting unit 112.

In the first embodiment, the temperature difference detecting unit 112 is formed by a bridge circuit including a temperature detector and a reference resistor, but it is not necessarily necessary to provide a reference resistor. The reference resistor may not be provided as long as the temperature difference detecting unit 112 detects a temperature difference that occurs between the upstream side and the downstream side of the heater 111 and outputs a signal value corresponding to the temperature difference.

Second Embodiment

Next, a fluid sensing apparatus according to a second embodiment will be described. The fluid sensing apparatus according to the present embodiment enables more reliable failure detection even when there is no fluid flow.

Figure 17:
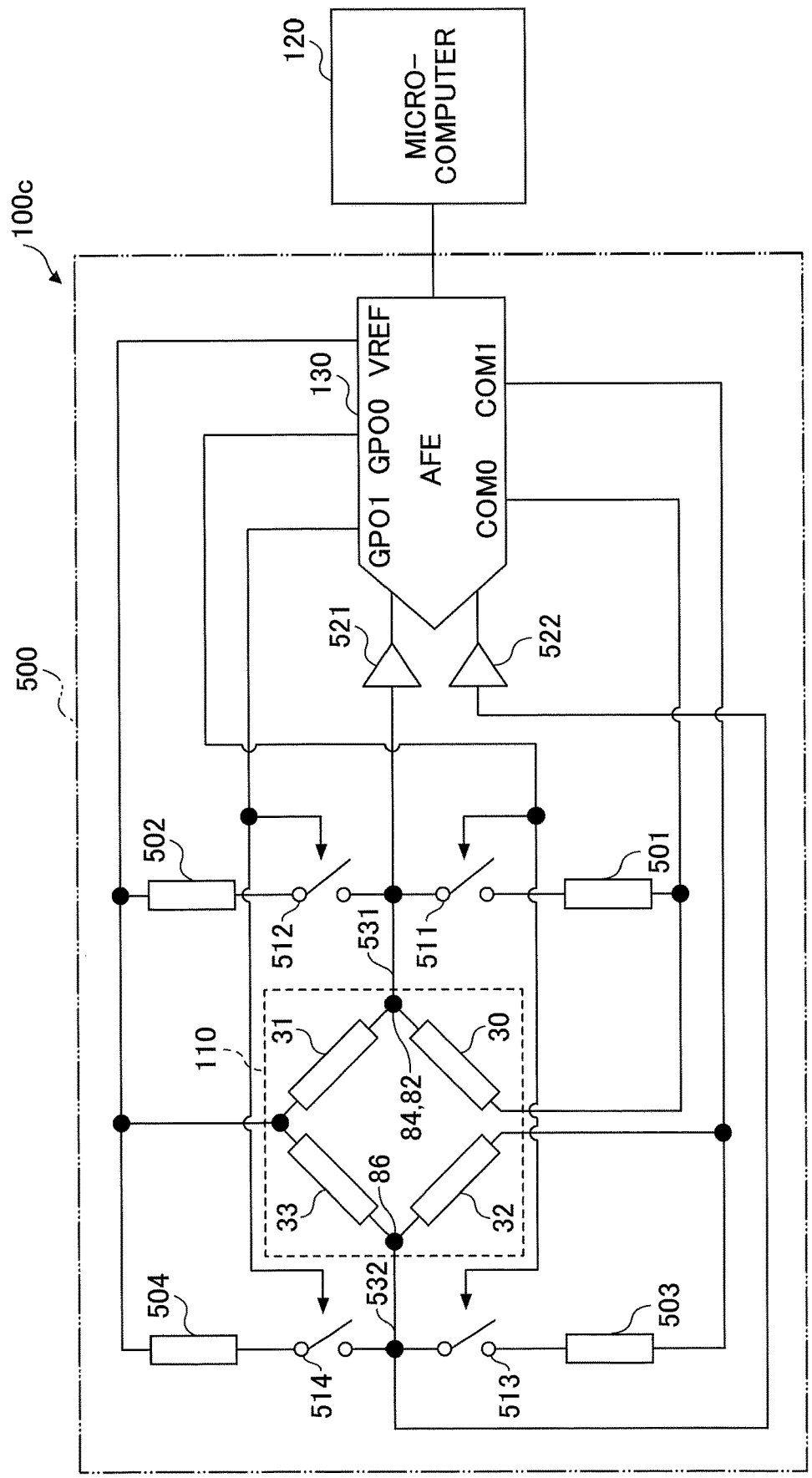
FIG. 17 is a diagram illustrating a configuration of a fluid sensing apparatus according to a second embodiment.

FIG. 17 is a diagram illustrating a configuration of a fluid sensing apparatus 100c according to the second embodiment. In FIG. 17, the fluid sensing apparatus 100c includes the fluid sensor 110, a sensor substrate 500 including the AFE circuit 130, and the microcomputer 120. The fluid sensor 110 is mounted on the sensor substrate 500.

The fluid sensor 110 has the same configuration as that of the first embodiment. In FIG. 17, only the X-axis temperature detectors 30 and 31 and Y-axis temperature detectors 32 and 33 are illustrated, among the elements of the fluid sensor 110. In FIG. 17, the reference resistors 91, 92, 96, and 97 for configuring the first and second bridge circuits 90 and 95 illustrated in FIG. 4, are omitted.

Each of the temperature detectors 30 to 33 is a resistor formed by vanadium oxide or the like. The temperature detectors 30 to 33 have approximately the same resistance value, and the resistance value is, for example, 200 kΩ.

The AFE circuit 130 has the same configuration as that of the first embodiment and includes a built-in E-type ADC.

The sensor substrate 500 is provided with four fixed resistors 501 to 504, four switches 511 to 514, and two operational amplifiers 521 and 522.

The fixed resistors 501 to 504 are used to offset the sensor output signal during a failure detection operation. The fixed resistors 501 to 504 each have approximately the same resistance value, and the resistance value is, for example, 1 kΩ. Compared to the temperature detectors 30 to 33, the fixed resistors 501 to 504 have a sufficiently smaller resistance value, and a smaller temperature dependence (the variation amount of the resistance value relative to the temperature change).

The fixed resistor 501 is connected via the switch 511 to a first output wiring 531 connected to the connection portion of the pads 82 and 84 to acquire a first intermediate potential X1. Similarly, the fixed resistor 502 is connected via the switch 512 to the first output wiring 531. The fixed resistor 501 is connected in parallel with the X-axis temperature detector 30, between the first output wiring 531 and the GND (a COM0 terminal of the AFE circuit 130) when the switch 511 is turned on. The fixed resistor 502 is connected in parallel with the X-axis temperature detector 31 between the first output wiring 531 and the power source (a VREF terminal of the AFE circuit 130) when the switch 512 is turned on.

The fixed resistor 503 is connected via the switch 513 to a second output wiring 532 connected to the pad 86 to acquire a second intermediate potential Y1. Similarly, the fixed resistor 504 is connected via the switch 514 to the second output wiring 532. The fixed resistor 503 is connected in parallel with the Y-axis temperature detector 32 between the second output wiring 532 and the GND (a COM1 terminal of the AFE circuit 130) when the switch 513 is turned on. The fixed resistor 504 is connected in parallel with the Y-axis temperature detector 33 between the second output wiring 532 and the power source (a VREF terminal of the AFE circuit 130) when the switch 514 is turned on.

The on/off of the switches 511 to 514 is controlled by the AFE circuit 130. In the present embodiment, the switches 511 and 513 are controlled by the GPO0 terminal, and the switches 512 and 514 are controlled by the GPO1 terminal. That is, the switches 511 and 513 are turned on or off simultaneously. Similarly, the switches 512 and 514 are turned on or off simultaneously.

The AFE circuit 130 may separately control the on/off of the switches 511 to 514. The switches 511 and 513 are connected to different output wirings and do not affect each other, and, therefore, in the present embodiment, the switches 511 and 513 are configured to be simultaneously turned on/off for simplifying the circuit. The switches 512 and 514 are also configured to be turned on/off simultaneously for the same reason.

The operational amplifier 521 is connected to the first output wiring 531, and the first sensor output signal Vx output from the fluid sensor 110 via the first output wiring 531 is impedance-converted and input to the AFE circuit 130. Similarly, the operational amplifier 522 is connected to the second output wiring 532, and the second sensor output signal Vy output from the fluid sensor 110 via the second output wiring 532 is impedance-converted and input to the AFE circuit 130.

In addition to the ADC, the AFE circuit 130 includes a memory for temporarily storing data of the sensor output signal that has been A/D converted by the ADC, an arithmetic processing unit, a sequencer, a non-volatile memory, and a communication interface such as I2C, and the like, which are built in the AFE circuit 130.

The microcomputer 120 performs failure determination by writing a sequence for failure determination into the sequencer of the AFE circuit 130.

Failure Detection Method—Second Embodiment

Figure 18A:
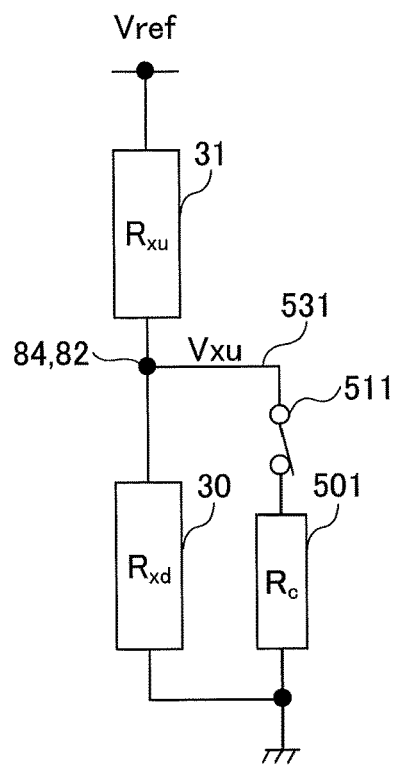
Figure 18B:
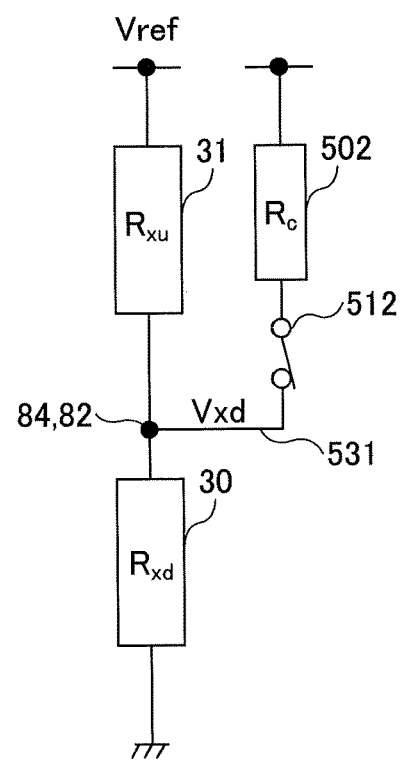
Figure 18C:
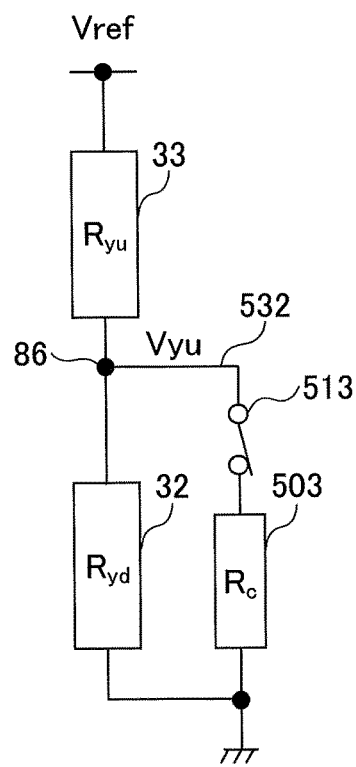
Figure 18D:
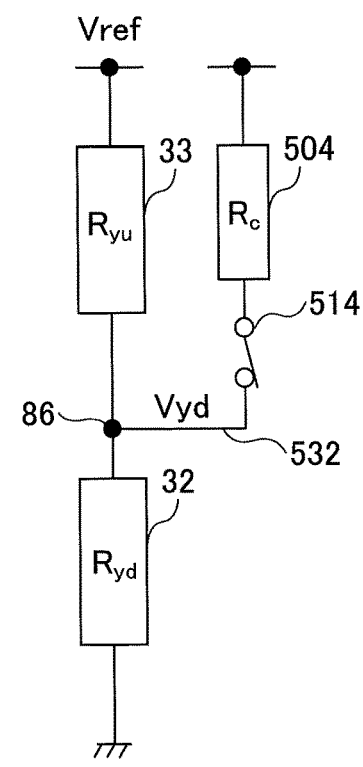

Next, a failure detection method according to the present embodiment will be described. FIGS. 18A to 18D are diagrams illustrating equivalent circuits when the switches 511 to 514 are respectively turned on. FIG. 18A illustrates an equivalent circuit when the switch 511 is turned on. FIG. 18B illustrates an equivalent circuit when the switch 512 is turned on. FIG. 18C illustrates an equivalent circuit when the switch 513 is turned on. FIG. 18D illustrates an equivalent circuit when the switch 514 is turned on.

As illustrated in FIG. 18A, when the switch 511 is turned on, the fixed resistor 501 is connected in parallel with the X-axis temperature detector 30, and, therefore, the first sensor output signal generated in the first output wiring 531 is referred to as "Vxu".

As illustrated in FIG. 18B, when the switch 512 is turned on, the fixed resistor 502 is connected in parallel with the X-axis temperature detector 31, and, therefore, the first sensor output signal generated in the first output wiring 531 is referred to as "Vxd".

As illustrated in FIG. 18C, when the switch 513 is turned on, the fixed resistor 503 is connected in parallel with the Y-axis temperature detector 32, and, therefore, the second sensor output signal generated in the second output wiring 532 is referred to as "Vyu".

As illustrated in FIG. 18D, when the switch 514 is turned on, the fixed resistor 504 is connected in parallel with the Y-axis temperature detector 33 and, therefore, the second sensor output signal generated in the second output wiring 532 is referred to as "Vyd".

Hereinafter, a failure determination method based on the first sensor output signal Vxu illustrated in FIG. 18A will be described. The first sensor output signal Vxu is represented by formula (3) below.

$$Vxu = V_{ref}[(R_c R_{xd})/((R_{xu} R_{xd}) + R_c(R_{xu} + R_{xd}))] \quad (3)$$

Here, $V_{ref}$ is the power source voltage (reference voltage) supplied from the VREF terminal. $R_{xd}$ is the resistance value of the X-axis temperature detector 30. $R_{xu}$ is the resistance value of the X-axis temperature detector 31. $R_c$ is the resistance value of the fixed resistor 501.

The first sensor output signal Vxu is approximated as represented by a formula (4) below, because $R_{xd} \approx R_{xu}$, $R_c \ll R_{xd}$, and $R_c \ll R_{xu}$.

$$Vxu \approx V_{ref}(R_c/R_{xu}) \quad (4)$$

Here, the resistance value $R_c$ is not temperature dependent, but the resistance value $R_{xu}$ is temperature dependent. When the resistance temperature coefficient of the resistance value $R_{xu}$ is TCR, the change amount $\Delta Vxu$ of the first sensor output signal Vx, due to the ON/OFF of the heater 111, is represented by the following formula (5).

$$\Delta Vxu \approx -V_{ref}(R_c/R_{xu}) TCR \cdot \Delta T \quad (5)$$

Here, the change amount $\Delta Vxu$ is the value obtained by subtracting the value of the first sensor output signal Vxu when the heater 111 is turned off from the value of the first sensor output signal Vxu when the heater 111 is turned on. $\Delta T$ is the elevated temperature when the heater 111 is turned on from the off state.

If the switch 511 is off, the X-axis temperature detector 30 and the X-axis temperature detector 31 have approximately the same temperature characteristics, and, therefore, when there is no fluid flow, even if the heater 111 is turned on, there is little difference in resistance value between the X-axis temperature detector 30 and the X-axis temperature detector 31, and there is little change in the first sensor output signal Vx.

On the other hand, in the present embodiment, even when there is no fluid flow, by turning on the switch 511, as represented by formula (5) above, the first sensor output signal Vxu does not depend on the temperature characteristics of the X-axis temperature detector 30 to which the fixed resistor 501 is connected in parallel, and the first sensor output signal Vxu varies according to the temperature characteristics of the X-axis temperature detector 31. Accordingly, in the present embodiment, even when there is no fluid flow, the failure determination based on the falling time Tf can be performed accurately.

In addition to the failure determination based on the first sensor output signal Vxu, the failure determination based on the first sensor output signal Vxd, the failure determination based on the second sensor output signal Vyu, and the failure determination based on the second sensor output signal Vyd are performed. When a failure is determined by at least one of these four failure determinations, it is determined that the fluid sensor 110 has failed.

In the present embodiment, in addition to the failure determination based on the falling time Tf, failure determinations based on the amplitude values of the first sensor output signals Vxu and Vxd, and the second sensor output signals Vyu and Vyd, when the heater 111 is turned on/off, are also performed.

Failure Determination Flow—Second Embodiment

Figure 19:
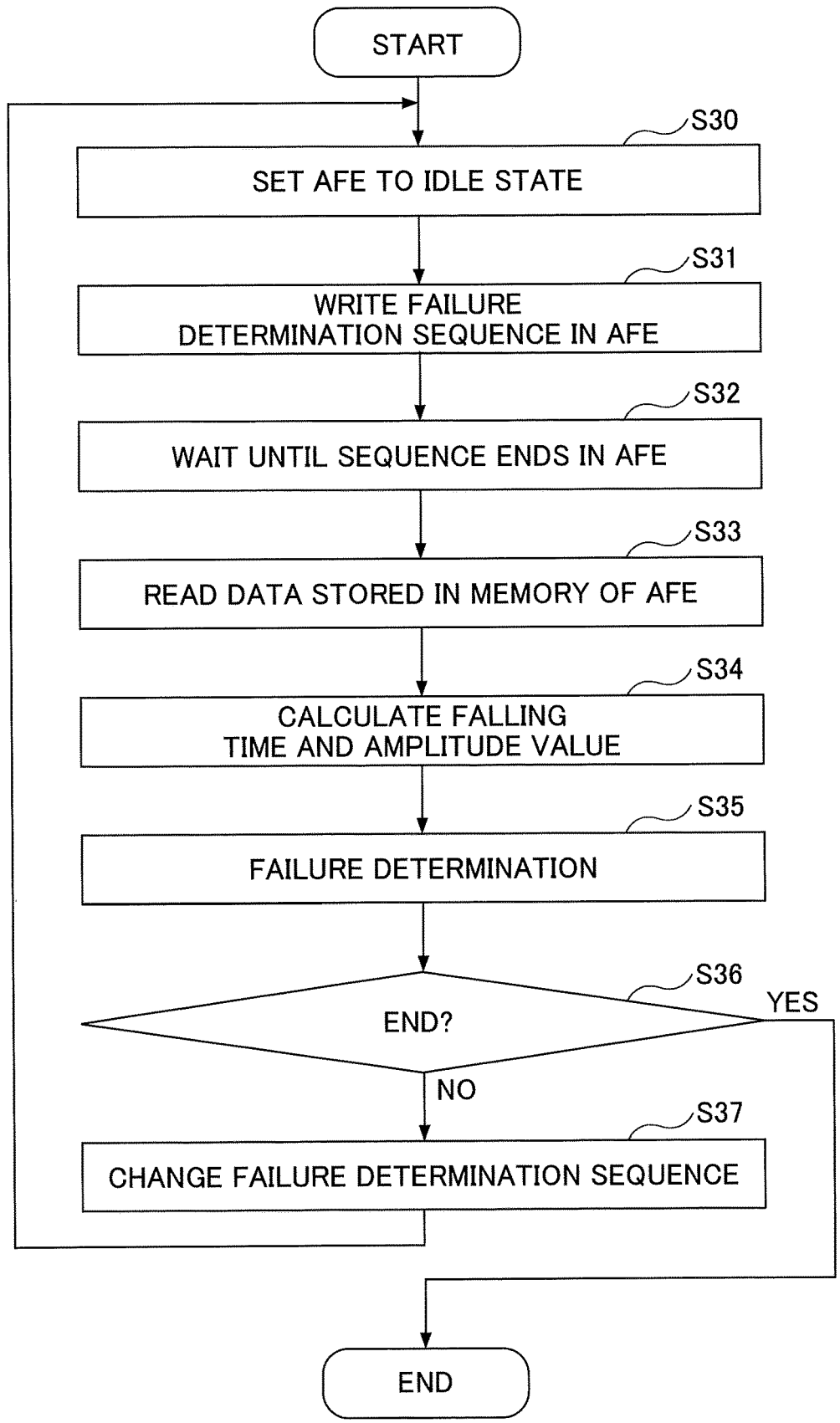
FIG. 19 is a flowchart illustrating a process performed by a microcomputer during a failure determination operation.
Figure 20:
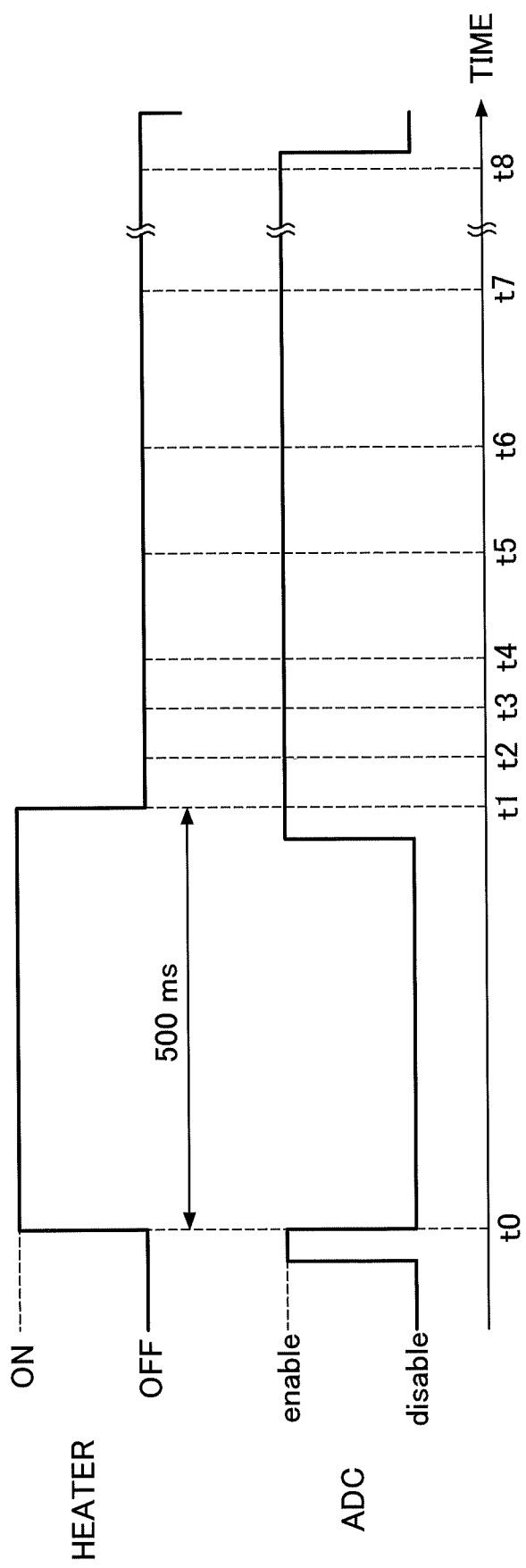
FIG. 20 is a timing diagram illustrating the operation timing of the heater and the ADC when the failure determination operation is performed.

The specific failure determination flow will be described below. FIG. 19 is a flowchart illustrating a process performed by the microcomputer 120 during a failure determination operation. FIG. 20 is a timing diagram illustrating the operation timing of the heater 111 and the ADC when the failure determination operation is performed.

As illustrated in FIG. 19, when starting the failure determination operation, the microcomputer 120 first sets the AFE circuit 130 to an idle state (step S30) and writes a failure determination sequence in the sequencer of the AFE circuit 130 (step S31). Here, the AFE circuit 130 first writes, in the sequencer, a failure determination sequence for performing a failure determination based on the first sensor output signal Vxu with the switch 511 turned on, as illustrated in FIG. 18A.

When the failure determination sequence is written in the AFE circuit 130, as illustrated in FIG. 20, the AFE circuit 130 performs on/off control of the heater 111, and controls the ADC, thereby performing A/D conversion by sampling the first sensor output signal Vxu at a predetermined timing, and stores the data after the A/D conversion in the memory in the AFE circuit 130.

Specifically, as illustrated in FIG. 20, the AFE circuit 130 switches the heater 111 from off to on at time t0 and sets the ADC to a disabled state from an enabled state. Then, the AFE circuit 130 turns on the heater 111 for a predetermined period of time (e.g., 500 ms) and turns off the heater 111 at time t1. The AFE circuit 130 sets the ADC to an enabled state immediately before the time t1 when the heater 111 is turned off. In the state where the heater 111 off, the AFE circuit 130 operates the ADC so as to sample the first sensor output signal Vxu at predetermined sampling intervals from the time t1, and performs A/D conversion. The times t1 to t8 represent the timings when to perform sampling. In the present embodiment, sampling is also performed at time t0 when the heater 111 is turned on.

Further, in the present embodiment, the sampling intervals are not equal; immediately after the heater 111 is turned off, the sampling interval is shortened, and the sampling interval is increased as time elapses. For example, if t1=0 ms, then t2=6.25 ms, t3=12.5 ms, t4=18.75 ms, t5=31.25 ms, t6=43.75 ms, t7=96.875 ms, and t8=600 ms. The memory in the AFE circuit 130 is sampled at times t0 to t8 and the data subjected to A/D conversion is stored.

Returning to FIG. 19, the microcomputer 120 waits until the above-described sequence by the AFE circuit 130 ends (step S32). The microcomputer 120 reads the data stored in the memory of the AFE circuit 130 when the sequence by the AFE circuit 130 is ended (step S33).

The microcomputer 120 calculates the falling time Tf of the first sensor output signal Vxu after turning off the heater 111, and the amplitude value A of the first sensor output signal Vxu according to the on/off of the heater 111, based on the read data (step S34). In the present embodiment, the microcomputer 120 calculates a time corresponding to two times the time constant τ as the falling time Tf, based on the data sampled at times t1 to t8. More specifically, the microcomputer 120 sets the data value of the time t8 as a steady-state value, and calculates the time until the data value of the time t1 reaches 86.5% of the steady-state value, as the falling time Tf. The falling time Tf calculated in this manner is approximately 20 ms, and, therefore, as described above, the sampling interval is shortened around the elapsed time of 20 ms after the heater 111 is turned off.

The microcomputer 120 calculates the amplitude value A, for example, by taking the difference between the data at the time t0 and the data at the time t1. The difference value between the data at time t1 and the data at time t8 (steady-state value) may be set as the amplitude value A.

Next, the microcomputer 120 performs failure determination based on the calculated falling time Tf and amplitude value A (step S35). As in the first embodiment, the falling time Tf is compared with the reference time Tref, and when the falling time Tf is greater than the reference time Tref, it is determined that the fluid sensor 110 has failed. With respect to the amplitude value A, when the amplitude value A is below a predetermined threshold value, it is determined that the fluid sensor 110 has failed.

When the failure determination is ended, the microcomputer 120 performs termination determination (step S36). Specifically, the microcomputer 120 determines whether the failure determination has ended for all the patterns illustrated in FIGS. 18A to 18D. When there is a pattern for which failure determination has not been performed (step S36: NO), the microcomputer 120 changes the failure determination sequence (step S37) and returns the process to step S30. When the failure determination has ended for all patterns (step S36: YES), the microcomputer 120 ends the process.

Experimental Examples—Second Embodiment

Hereinafter, experimental examples of failure determination by the fluid sensing apparatus 100c according to the second embodiment will be described.

Experimental Example 1

Figure 21:
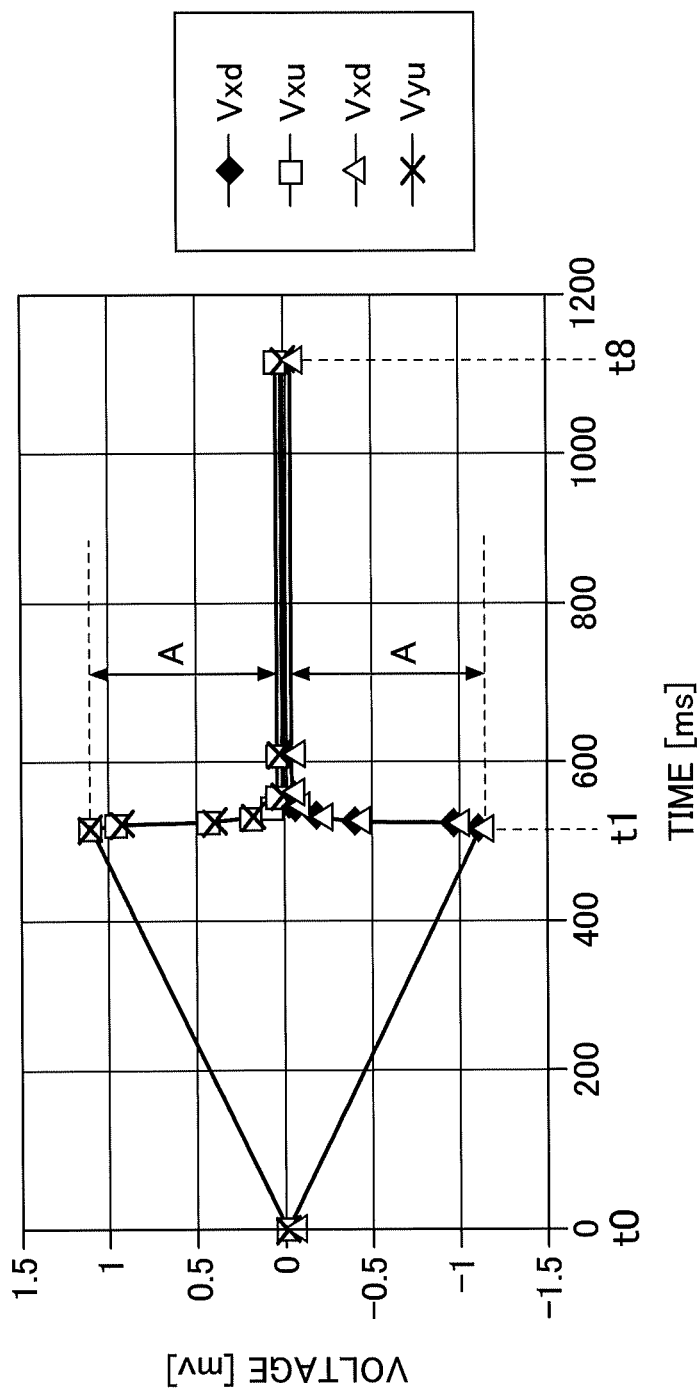
FIG. 21 is a diagram illustrating a change in the output signal when the fluid sensor is normal.
Figure 22:
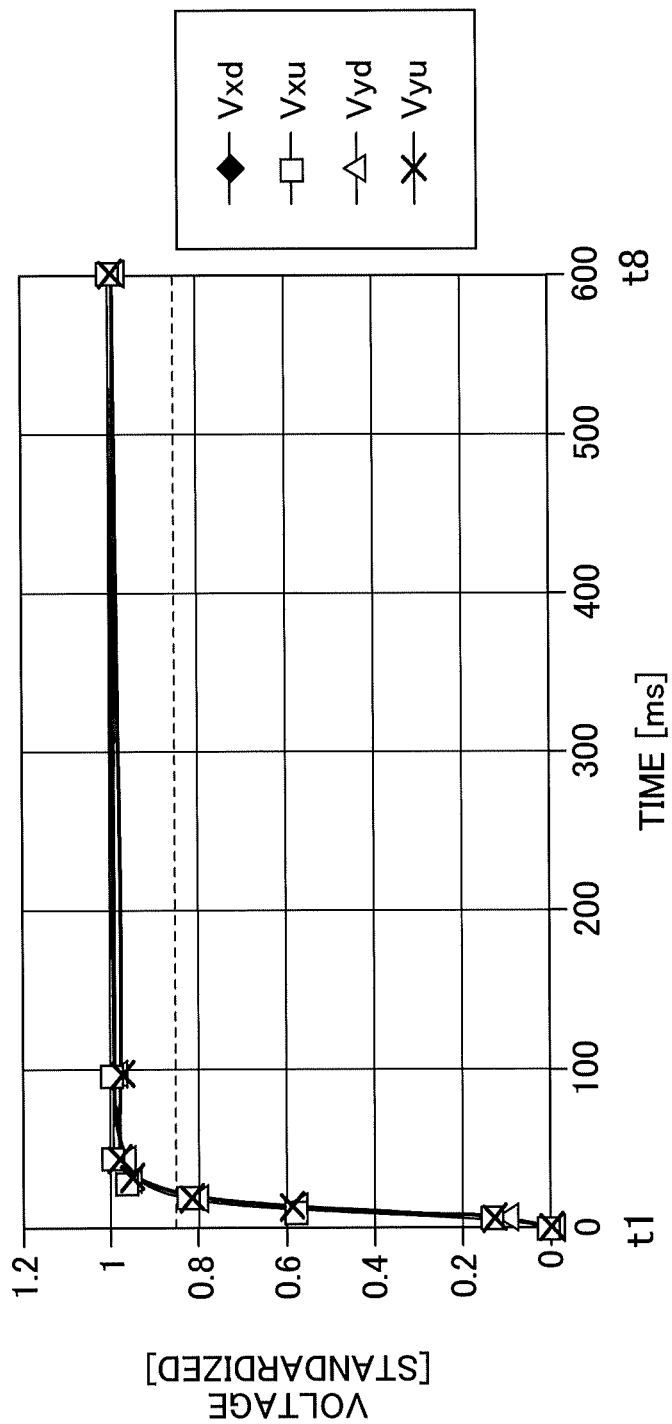
FIG. 22 is a diagram illustrating a change in the output signal when the fluid sensor is normal.

FIGS. 21 and 22 are diagrams illustrating changes in the output signal when the fluid sensor 110 is normal. FIG. 21 is a diagram obtained by plotting data sampled at times t0 to t8 for the first sensor output signals Vxu and Vxd, and the second sensor output signals Vyu and Vyd, respectively. FIG. 22 is a diagram obtained by standardizing the output signals after the heater 111 is turned off, so that the voltage value at the time t1 is set to "0" and the voltage value at the time t8 is set to "1". Note that the dashed line in FIG. 22 indicates the voltage value that is 86.5% with respect to the standardized value "1".

Figure 23:
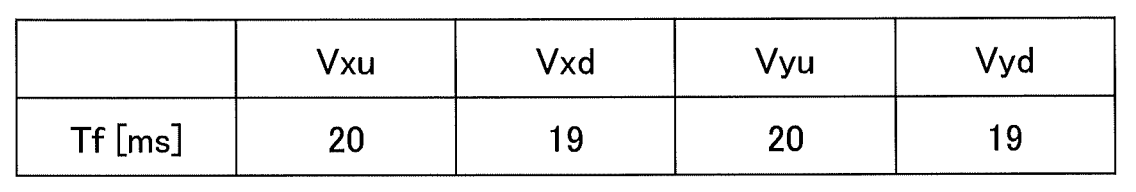

FIG. 23 is a diagram indicating examples of calculated values of the falling time Tf when the fluid sensor 110 is normal. FIG. 23 indicates the calculated values based on FIGS. 21 and 22. The falling time Tf is assumed to be a time corresponding to twice the time constant τ as described above. The calculated values of the falling time Tf were 19 ms to 20 ms.

Experimental Example 2

Figure 24:
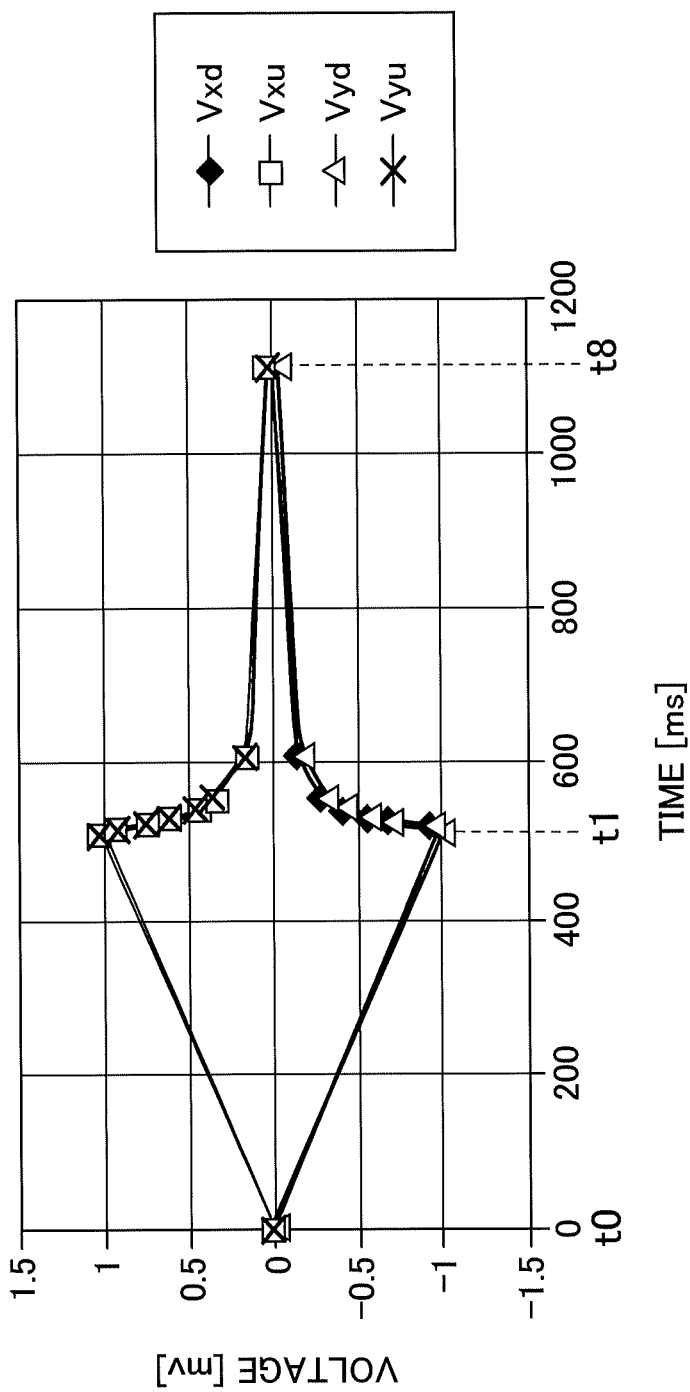
FIG. 24 is a diagram illustrating a change in the output signal when soil adheres as foreign matter on the fluid sensor.
Figure 25:
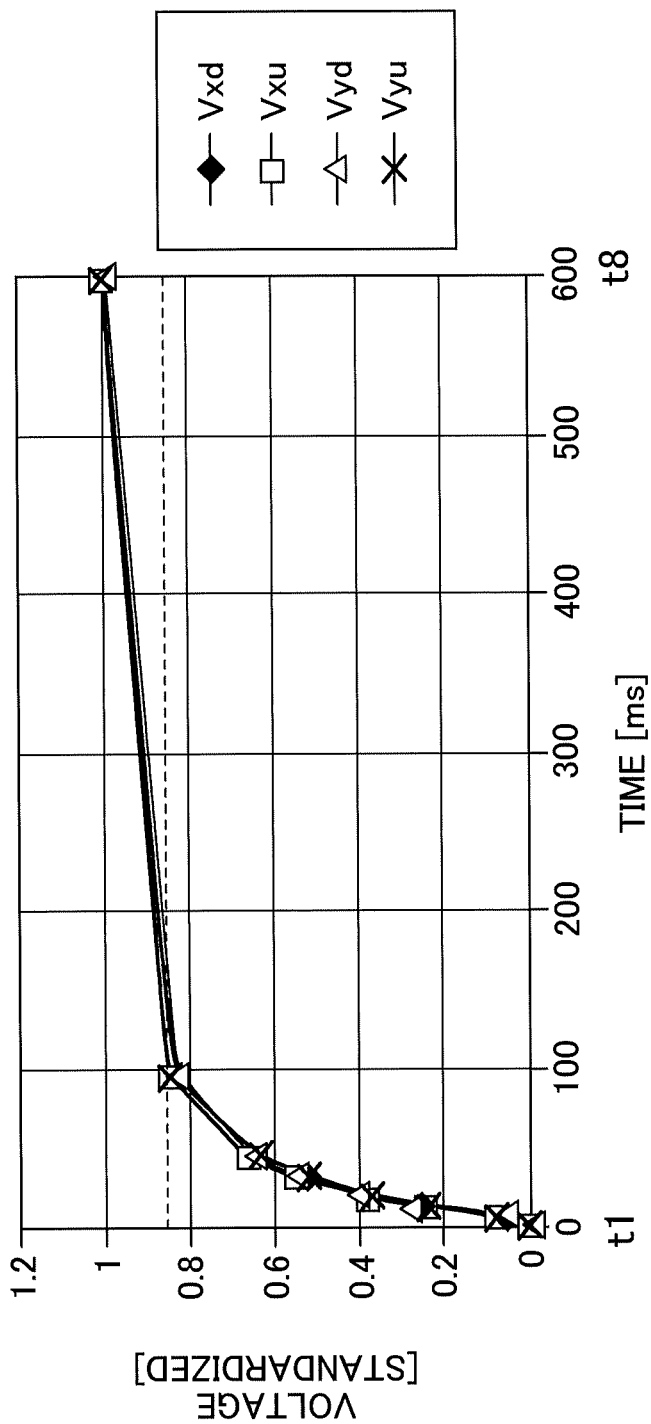
FIG. 25 is a diagram illustrating a change in the output signal when soil adheres as foreign matter on the fluid sensor.

FIGS. 24 and 25 are diagrams illustrating changes in the output signal when soil adheres as foreign matter to the fluid sensor 110. FIG. 24 is a diagram obtained by plotting data sampled at times t0 to t8 for the first sensor output signals Vxu and Vxd, and the second sensor output signals Vyu and Vyd, respectively. FIG. 25 is a diagram obtained by standardizing the output signals after the heater 111 is turned off, so that the voltage value of the time t1 is set to "0" and the voltage value of the time t8 is set to "1". Note that the dashed line in FIG. 25 indicates the voltage value that is 86.5% with respect to the standardized value "1".

Figure 26:
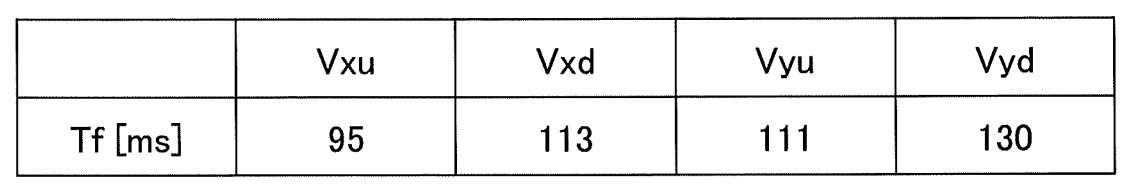

FIG. 26 is a diagram indicating examples of calculated values of the falling time Tf when soil adheres as foreign matter to the fluid sensor 110. FIG. 26 indicates the calculated values based on FIGS. 24 and 25. The falling time Tf is assumed to be a time corresponding to twice the time constant τ as described above. The calculated values of the falling time Tf were 95 ms to 130 ms.

As described above, when the soil adheres to the fluid sensor 110 as foreign matter, the falling time Tf is significantly longer, indicating that it is possible to determine the failure based on the falling time Tf.

Experimental Example 3

Figure 27:
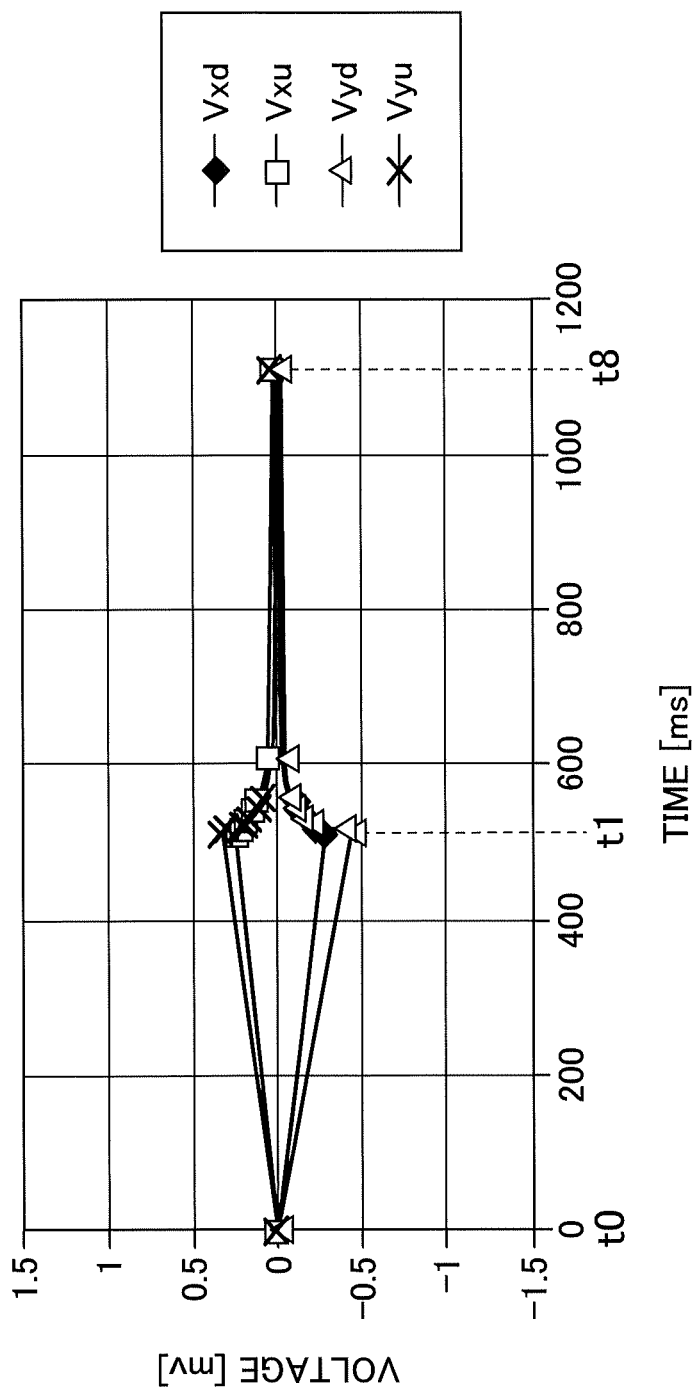
FIG. 27 is a diagram illustrating a change in the output signal when water adheres as foreign matter on the fluid sensor.
Figure 28:
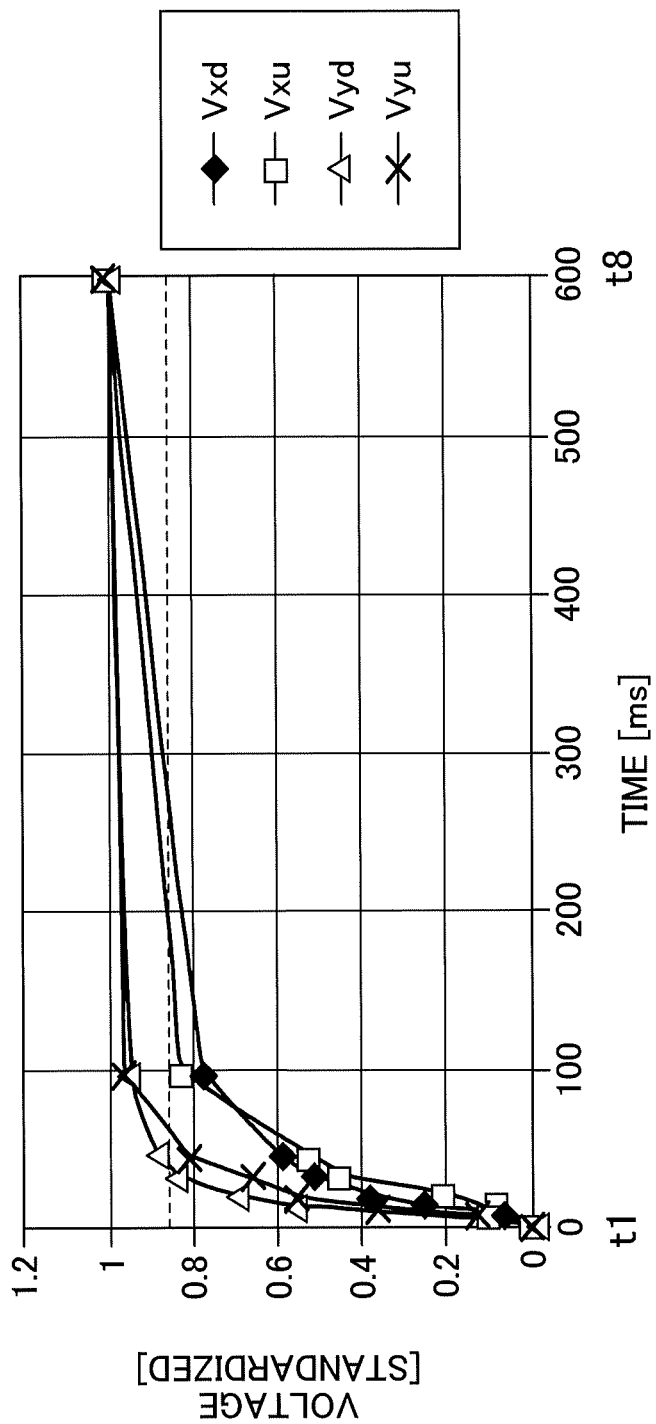
FIG. 28 is a diagram illustrating a change in the output signal when water adheres as foreign matter on the fluid sensor.

FIGS. 27 and 28 are diagrams illustrating changes in the output signal when water adheres as foreign matter to the fluid sensor 110. FIG. 27 is a diagram obtained by plotting data sampled at times t0 to t8 for the first sensor output signals Vxu and Vxd, and the second sensor output signals Vyu and Vyd, respectively. FIG. 28 is a diagram obtained by standardizing the output signals after the heater 111 is turned off, so that the voltage value of the time t1 is set to "0" and the voltage value of the time t9 is set to "1". Note that the dashed line in FIG. 28 indicates the voltage value that is 86.5% with respect to the standardized value "1".

Figure 29:
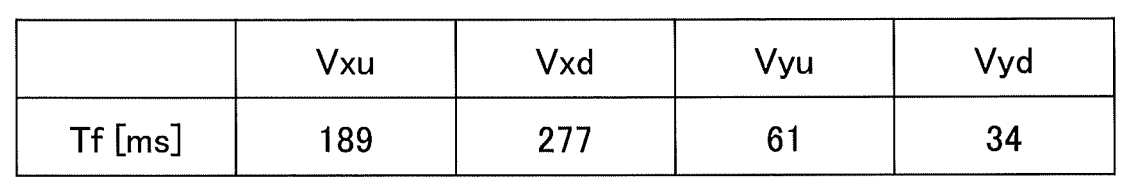

FIG. 29 is a diagram indicating calculated values of the falling time Tf when water adheres as foreign matter to the fluid sensor 110. FIG. 29 illustrates the calculated values based on FIGS. 27 and 28. The falling time Tf is assumed to be a time corresponding to twice the time constant τ as described above. The calculated values of the falling time Tf were 34 ms to 270 ms.

As described above, when water adheres as foreign matter to the fluid sensor 110, the falling time Tf is significantly longer, indicating that it is possible to determine the failure based on the falling time Tf. As illustrated in FIG. 21, the amplitude value A was approximately 1.1 mV when the fluid sensor 110 was normal, while in the experimental example 3, the amplitude value A decreased to approximately 0.2 mV to 0.4 mV as illustrated in FIG. 27, and, therefore, it is understood that failure determination based on the amplitude value A is also possible.

Modification Example of Second Embodiment

In the second embodiment, the four fixed resistors 501 to 504 are provided to respectively correspond to the four temperature detectors 30 to 33. However, there may be only one fixed resistor, and the one fixed resistor may be configured so as to be selectively connected in parallel with each of the temperature detectors 30 to 33 by a multiplexer or the like.

In the second embodiment, the operational amplifiers 521 and 522 are connected to the first output wiring 531 and the second output wiring 532, respectively, but these operational amplifiers 521 and 522 are not essential.

In the second embodiment, the failure determination control of the fluid sensor 110 is performed by the sequencer of the AFE circuit 130, but the failure determination control of the fluid sensor 110 may be performed by firmware or the like.

According to each of the embodiments described above, a thermal fluid sensing apparatus and a method for detecting failures of a fluid sensor that can detect failures caused by adhesion of foreign matter, are realized.

Although the preferred embodiments of the invention have been described in detail, the invention is not limited to the embodiments described above, and various modifications and substitutions may be made to the embodiments described above without departing from the scope of the invention.

What is claimed is:

1. A fluid sensing apparatus comprising:
    a fluid sensor configured to detect a temperature distribution on a detection surface caused by heating, and output a signal value corresponding to a flow of a fluid;
    a microprocessor configured to turn on a heater for a predetermined time, turn off the heater after the predetermined time and start a time count;
    a falling time counting unit configured to count a falling time of the signal value after stopping the heating, wherein the falling time counting unit acquires and stores the signal value at regular intervals corresponding to the flow of the fluid to determine a stop of the time count and the falling time of the signal value; and
    a failure determining unit configured to perform a determination of a failure in detecting the flow of the fluid when the output signal value of the fluid sensor varies, wherein the failure determining unit performs the determination of the failure by comparing the falling time with a reference time.

2. The fluid sensing apparatus according to claim 1, wherein the falling time counting unit counts a time until a difference value between the signal values becomes less than or equal to a threshold, as the falling time.

3. The fluid sensing apparatus according to claim 1, wherein the falling time counting unit counts a time until the signal value becomes lower than a predetermined value, as the falling time.

4. The fluid sensing apparatus according to claim 3, wherein the predetermined value is a fixed value.

5. The fluid sensing apparatus according to claim 3, wherein the predetermined value is a signal value output from the fluid sensor in a state where the heating is not performed.

6. The fluid sensing apparatus according to claim 1, wherein the falling time counting unit obtains a decrease rate of the signal value after stopping the heating, and counts a time when the decrease rate exceeds a predetermined value, as the falling time.

7. The fluid sensing apparatus according to claim 1, wherein the fluid sensor includes:
    a heating unit configured to cause the temperature distribution by heating the fluid; and
    a temperature difference detecting unit configured to detect a temperature difference that occurs between an upstream side and a downstream side of the heating unit, and output the signal value; the signal value corresponding to the temperature difference.

8. The fluid sensing apparatus according to claim 7, wherein the heating unit and the temperature difference detecting unit are disposed on a membrane formed in the fluid sensor.

9. The fluid sensing apparatus according to claim 8, wherein the temperature difference detecting unit includes at least two temperature detectors disposed on the upstream side and the downstream side of the heating unit, and outputs the signal value; the signal value corresponding to a difference between resistance values of the at least two temperature detectors.

10. The fluid sensing apparatus according to claim 9, wherein the at least two temperature detectors are positioned at different distances from the heating unit.

11. The fluid sensing apparatus according to claim 9, further comprising:
    a fixed resistor having a smaller resistance value and a smaller temperature dependency than the at least two temperature detectors; and a switch configured to selectively connect the fixed resistor in parallel with one of the at least two temperature detectors, wherein the signal value is generated in a state where the fixed resistor is connected in parallel with one of the at least two temperature detectors; and the falling time counting unit counts the falling time based on the signal value.

12. A method for detecting a failure of a fluid sensor, the fluid sensor being configured to detect a temperature distribution on a detection surface caused by heating and output a signal value corresponding to a flow of a fluid, the method comprising:

turning on a heater for a predetermined time, turning off the heater after the predetermined time and starting a time count;

counting a falling time of the signal value after stopping the heating, wherein the signal value is acquired and stored at regular intervals corresponding to the flow of the fluid to determine a stop of the time count and the falling time of the signal value; and performing a determination of a failure in detecting the flow of the fluid when the output signal value of the fluid sensor varies;

wherein the determination of the failure is performed by comparing the falling time with a reference time.

* * * * *